US006026196A

United States Patent [19]
Shannon et al.

[11] Patent Number: 6,026,196
[45] Date of Patent: Feb. 15, 2000

[54] UTILIZING A CONTRIVED DITHER MATRIX TO ENHANCE THE COMPRESSIBILITY OF RASTER IMAGES

[75] Inventors: Terrence M. Shannon, Kuna; Michael G. Fuchs, Boise, both of Id.

[73] Assignee: Hewlett-Packard Co., Palo Alto, Calif.

[21] Appl. No.: 08/953,848

[22] Filed: Oct. 15, 1997

Related U.S. Application Data

[60] Provisional application No. 60/044,940, Apr. 25, 1997.

[51] Int. Cl.$^7$ .............................. G06K 9/36; G06K 9/46
[52] U.S. Cl. ...................... 382/237; 358/456; 358/457
[58] Field of Search .................... 358/457, 455, 358/456, 426, 298, 429; 382/237, 232; 395/109

[56] References Cited

U.S. PATENT DOCUMENTS

| | | | |
|---|---|---|---|
| 4,947,259 | 8/1990 | Katsuta | 358/426 |
| 5,073,966 | 12/1991 | Sato | 382/232 |

*Primary Examiner*—Thomas D. Lee
*Attorney, Agent, or Firm*—Anthony J Baca

[57] ABSTRACT

The present invention reduces the amount of data sent to a printer from a printer driver. Data reduction is achieved by using a dither matrix that is designed to produce compressible images, then using a lossless compression scheme that matches the dither matrix.

9 Claims, 21 Drawing Sheets

LEVEL 1-11
 LEVEL 12-21
 LEVEL 22-31
 LEVEL 32-42

LEVEL 43-52
 LEVEL 53-63
 LEVEL 64-73
 LEVEL 74-83

LEVEL 84-94
 LEVEL 95-104
 LEVEL 105-113
 LEVEL 114-121

LEVEL 122-133
 LEVEL 134-144
 LEVEL 145-152
 LEVEL 153-161

LEVEL 162-170　LEVEL 171-179　LEVEL 180-188　LEVEL 189-179

LEVEL 198-205　LEVEL 106-211　LEVEL 212-216　LEVEL 217-223

LEVEL 224-226　LEVEL 227-231　LEVEL 232-239　LEVEL 240-246

LEVEL 247-249　LEVEL 250-254　LEVEL 255

UTILIZING A CONTRIVED DITHER MATRIX TO ENHANCE THE COMPRESSIBILITY OF RASTER IMAGES

This application claims the benefit of U.S. Provisional Application No. 60/044,940, filed Apr. 25, 1997.

TECHNICAL FIELD

The present invention relates to data compression and more particularly to using a contrived dither matrix to increase data compression ratios of raster images.

BACKGROUND OF THE INVENTION

As monochrome laser printer technologies improve, printers can create pages with higher image resolution. The amount of raster data needed to be sent to a printer to print an image also increases, adversely affecting printer performance. When an image is scaled and dithered before it is sent to a printer, an 8 by 10 inch raster image requires 0.9 Mbytes of data for a 300 DPI device, 3.6 Mbytes for a 600 DPI device, and 14.4 Mbytes of data for a 1200 DPI device.

Some printers and drivers, such as monochrome Hewlett-Packard LaserJets® printers, are capable of accepting either color raster data or dithered monochrome raster data to print an image. If color data is sent, the printer performs scaling and dithering and produces exactly the same image that would have been produced if the driver scaled and dithered. The choice to send color data verses dithered monochrome data is based on reducing the amount of I/O needed to print the image. Color images have more data per pixel, but scaled and dithered monochrome images are usually higher resolution, in this case 600 or 1200 DPI. If a source color image is of low resolution, or is significantly scaled up, then there is an I/O advantage to send a version of the source image and let the printer perform scaling and dithering. In practice, the source color image is usually converted to an 8 bit per pixel grayscale image by the driver. If the source color image is of high resolution or if it is not significantly scaled, then there will be less I/O if the printer driver performs dithering and scaling, and sends the printer a monochrome image that is ready to print. Some laser printers do not have the capability to accept color or grayscale data, so scaling and dithering is always performed on the host by the driver.

There are several compression options available to compress source images or dithered monochrome images. Most are variants of tagged image file format (TIFF revision 4) and delta row compression. The available versions of delta row compression are not effective for dithered monochrome images because each row is made different from the previous row by virtue of the dither matrix. The run length encoded TIFF compression methods are the best alternative currently available, and they work best when the dithered image is significantly scaled up or when the resulting image has a lot of area that is of the same color, such as business graphics and charts. TIFF revision 4 is the compression method used by all Hewlett-Packard released monochrome LaserJet® printer drivers to date.

Scaling an image affects the compressibility of an image because one source pixel produces many similar output pixels, and the compressibility using a TIFF scheme relies on the similarity of adjacent pixels. It should also be noted that scaling is not done just to change the physical dimensions of an image, scaling is also used to convert image resolution. For example, if a source image has a resolution of 72 pixels per inch and has a dimension of 5 inches by 5 inches, it will contain 129,600 pixels. When the image is scaled and dithered for a 1200 DPI monochrome printer, and printed as a 5 inch by 5 inch image, it will be scaled to 36,000,000 pixels.

The most problematic raster images printed on monochrome laser printers are high resolution images similar to scanned photographs. What makes these images difficult to compress is the high frequency components. Experimentation has shown that low to moderate resolution scanned photos, business graphics, line art, and small high resolution images do not pose much of a performance challenge to LaserJet® printers. Large, high resolution images that resemble photographs offer a considerable challenge due to the amount of I/O sent to the printer. Sources of high resolution raster images are becoming more prevalent with the increased use of the internet, availability of inexpensive scanners, digital cameras, video capture computer accessories, and photo scanning services. This present invention addresses the performance challenge posed by high resolution photographic like raster images.

Microsoft Windows® (Windows is a registered trademark of Microsoft Corporation) defines a set of raster operations (ROPs) that are used to combine raster images. Hewlett-Packard LaserJet® printers are capable of performing ROPs even if the image is transformed to monochrome data by scaling and dithering on the host computer prior to being sent to the printer. To be ROP compatible, all transformation operations from a source DIB to a destination monochrome bitmap must be deterministic on a pixel by pixel basis so that exact results are obtained any time a source pixel is transformed. Consider an example where an application program uses an XOR (exclusive or) ROP to create a white window in the center of a raster image. First, the application program sends the entire color image to the driver where the color data is scaled and dithered into monochrome data. This dithered image is sent to the printer and no record of it or the source color image remains available to the driver. Next, the application selects a subset of the same image and sends it to the printer. The driver dithers and scales this subset image. For the XOR ROP to be successful, each pixel of dithered data from the image subset must exactly match the pixels of the original image within the bounds of the image subset, so each source image pixel must undergo the exact same scaling and dithering to produce a dithered raster segment where each destination dot of the image subset exactly overlays the destination dots of the original image. "Neighborhood" operations where the value of a destination pixel may depend on the value of a neighboring pixel will not be ROP compatible if the neighboring pixels are not available to be used in the subsequent ROP.

Examples of other transformations that use neighborhood operations are error diffusion dithering, blue noise dithering, and bi-linear scaling. Lossy compression techniques must also be excluded if we wish to retain ROP compatibility. Although ROPs are defined for raster data, they are seldom used by application programs. In the above example, the white rectangle could have been accomplished by sending a rectangle of white raster with an opaque drawing mode.

Historically, ROPs have provided Windows with fast, easy ways to manipulate raster graphics on a display screen. The Windows® GUI is successful, in part, because it provides a means to write to any device using the same set of graphical commands (GDI). Every Windows® compatible raster device supports ROPs either directly or by letting GDI provide the support. Regardless of the frequency of use, since ROPs are defined and available for application programs to use, a functionally complete printer driver must support ROPs.

Another example that illustrates the need to avoid neighborhood operations and remain deterministic is the fact that some application programs send image data in segments. An image may be split horizontally or vertically into segments as small as one pixel. One reason that application programs may fragment raster images is because Windows® does not yet support arbitrary raster rotation, so applications rotate images prior to sending them to the driver. Some applications process the rotation in segments, and send each segment to the driver as it is completed, letting the printing process assemble the final image from the segments. Single pixel calls are sometimes found at the tip and the base of a rotated image. These image segments may be scaled and dithered by the printer driver before being sent to the printer, and each image segment must seamlessly join adjacent segments to make the final printed image. Neighborhood operations may cause unacceptable artifacts to appear at the borders of the image segments.

This present invention uses clustered dot ordered dithering to be deterministic and supports ROPs as well as seamless image construction. See, Ulichney, R., *Digital Halftoning*. MIT Press, Cambridge, Mass., 1987. This determinism refers to the fact that a given source pixel will create a specific group of destination pixels as a function of scaling and dithering, and those destination pixel values are solely determined by the value of the single source pixel.

SUMMARY OF THE INVENTION

In order to accomplish the present invention there is provided a method for converting a multi-bit per pixel image into a single bit per image. The method first defines a contrived dither matrix having four quadrants. Each row in each quadrant is defined to have a reduced set of patterns. A plurality of indexes are defined, where each index defines one of the reduced set of patterns. A super dither matrix has four quadrants with each quadrant consisting of a contrived dither matrix. The super matrix is tiled over the multi-bit per pixel image. Next, each portion of the multi-bit per pixel image is compared with a corresponding contrived dither matrix to create portions of the single bit per image. Each single bit per image portion is compressed using one of the pluralities of indexes where the one of the reduced patterns matches a pattern in the single bit per image portion. The compressor compresses all portions of the single bit per image created by a first quadrant of the contrived dither matrix followed by all portions of the single bit per image created by a second quadrant of the contrived dither matrix and continuing until all portions of the single bit per image are compressed.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention produces improved compression ratios for compression of raster images. The preferred embodiment of the present invention is most useful for dithering and compressing high resolution images that resemble photographs. It is intended to be used by printer drivers that scale and dither on the host computer to reduce the amount of I/O that is sent to the printer. High resolution implies that the source image will not undergo much scaling when they are converted to dithered monochrome images. This present invention is intended to address a performance problem that monochrome printers may experience when high resolution images are encountered. The present invention generally achieves higher compression ratios for all images. While the present invention was developed for a 1200 DPI printer, the techniques discussed herein are directly apply to other devices, or any high resolution monochrome device. The data in present below comparing output file sizes includes the compressed output produced by a LaserJet® driver. Since the only driver available is for a 600 DPI device, and the source images are large high resolution images, scaling ratios 3 and 4 exceeded the capacity of the 600 DPI driver. Scaling ratios 3 and 4 do not contain driver output data.

The printer used was a LaserJet® 4 plus with a LaserJet® 5 prototype formatter board. The technique discussed in this present invention can be applied to any monochrome printer, even those using liquid and solid inks.

There are several terms used in this present invention that may not be familiar to all users. A DIB is a device independent bitmap that is a raster file format in common use in the Microsoft Windows® operating system. DPI means dots per inch and is used in this present invention to describe the resolution of raster files and printers. It is somewhat of a misnomer to apply DPI to a DIB, but the following description describes source images as if they have a resolution. This was done because by the time a DIB call reaches a printer driver, the GDI in concert with the application program, has determined a resolution for the DIB in the context of a call to a device of a specific resolution (such as a 600 DPI printer). A ROP is a raster operation as described by Windows® documentation. The term RLE as used means run length encoding of a compressed file, a known method used to compress data that tends to have repeating patterns.

This preferred embodiment of the present invention defines a dither matrix that is specifically designed to be compressed. The dither matrix retains the same perceived image quality as the matrix that is currently used in Hewlett-Packard LaserJet® printers, but has properties that enables the dithered image to be compressed at ratios higher than the compression methods currently employed. As a result, printing performance is faster than current methods because there is less data sent to the destination device.

Figure 1:
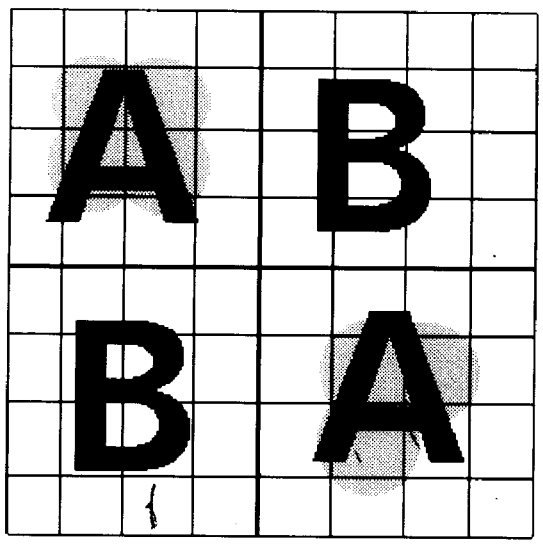
FIG. 1 shows a conventional 8×8 matrix with quadrants labeled.

The present invention is not limited to a specific embodiment illustrated herein. Referring particularly to FIG. 1. The dither matrix is contrived to be compressible, ROP compatible, and produce images of good quality. This is accomplished by starting with a conventional 8×8 pixel ordered clustered dot dither matrix on a 45 degree screen angle. This is a classical dithering method that is rooted in work pioneered by B. E. Bayer. Bayer, B. E., "An optimum method for two-level rendition of continuous-tone pictures" in *Proceedings of IEEE International Conference in Communications*, pp. 26.11–26.15, 1973. FIG. 1 is a conventional 8×8 dither matrix with seven out of sixty-four pixels filled. If this pattern were repeated across the page in a tessellated fashion, a pattern of about 15% gray would result.

Each quadrant of the 8×8 matrix is a 4×4 pixel group. These 4×4 quadrants are split into two similar groups, labeled A and B as illustrated in FIG. 1. Light grays only contain dots within group A, leaving group B blank. This makes group B very compressible when shades are light. In this example, group A has the only dot activity because the shades are light. For dark shades, group A is completely filled with dots, and group B will have dot activity as the levels of gray gradually change.

Consider how dots fill group A. When the gray level is zero (white), no dots in the 4×4 quadrants are on. As the gray level gradually increases, black dots will be placed near the center of the 4×4 quadrant A to make the apparent gray level of the entire 8×8 matrix seem darker. The individual dots are placed adjacent to each other to construct a clustered group of dots that grows within the bounds of the 4×4 quadrant.

The preferred embodiment of the present invention uses the convention of white having gray level 0 and black having gray level 255. This convention is common for monochrome printers where black dots are placed on a white page and is opposite of the convention of using intensity 0 to be black and intensity 255 to be white for screen displays where white dots are placed on a black screen.

To understand how a dot cluster is created, one must first understand how a dot is created in a laser printer. The laser is controlled with an accuracy that is relatively high with respect to the rest of the printing process. The light of the laser causes a static electrical charge to bleed through the print drum in the laser target area. This charge is used to attract opposite charged toner to the drum in the same location that the laser light struck the drum. Charged paper then attracts the toner from the drum to the paper and the toner is fused to the paper by heat and pressure. This is not a precision process. In the final output, each dot is actually an asymmetrical blob on the paper.

The size of this blob is important for controlling the quality of printed text on the page. Because text is black, viewers desire the blackest, crispest text available. This is accomplished by using the smallest blob size practical while still obtaining complete toner coverage for black text and graphics. The dots in FIG. 1 are represented by ideal circles that just overlap enough to make complete coverage. While this ideal representation is not a true model, it works well enough to develop a dither matrix. A logical pixel for a 600 DPI printer would be a square where each edge would have a length of $\frac{1}{600}$ inches. An ideal dot of toner would be a circle that completely covers the square and intersects the square at each corner. This circle of toner would have four chords that overlap into neighboring squares to the top, right, bottom, and left of the filled square. If the area of the square is normalized to an area of 1 square unit, then the circle would have a diameter equal to the diagonal of the square, for an area of 1.57 square units. Each of the chords that overlap neighboring squares would have area 0.143 square units.

If we consider the lightest shade of gray possible using an 8×8 dither matrix, there would be one dot of area 1.57 in 64 square units, for a coverage of 2.45%. In practice, turning on just one dot in 64 causes a pattern that is too coarse, so a dot is turned on in each of the A quadrants for a coverage of 4.91% for the lightest shade practical. Consider adding a second dot to one of the quadrants. The objective is to add a second dot in a way to affect the total coverage in the least amount possible, as provided by cluster dot ordered dithering. This preserves the ability to have the maximum levels of gray in the quadrant. The second dot is placed adjacent to the first dot so that the two dots share an overlapping chord.

The resulting two dots cover 2 unit squares and have 6 chords protruding into adjacent squares for an area of 2*1+6*0.143=2.86 square units for the 4×4 quadrant, or 2.86+1.57=4.43 units out of the 64 available in the 8×8 matrix for a gray level of 6.92%. The fourth dot brings the gray level to 8.94%, and a fifth dot yields 10.95% gray. In actual practice, the cluster of dots follows this model fairly well, even though the print process causes the dots to meld together into an amorphous blob that only somewhat resembles a collection of individual dots. The size and density of these amorphous blobs on the final paper output are hard to control due to the print process, but their placement is exact due to the precision laser control. There is an element of ambiguity in the dot cluster shapes, but image quality is not adversely affected by the contrived dither matrix. In effect, the contrived dither matrix adds to the ambiguity of the dot clusters by not growing the dot clusters in the same manner as the typical dither matrix in FIGS. 3 and 5.

Figure 2:
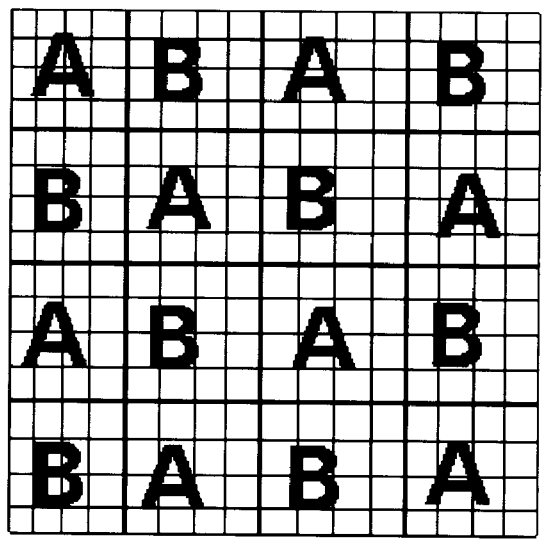
FIG. 2 shows a 16×16 matrix.

To achieve a smooth transaction of gray levels, our current method expands the 8×8 matrix into a 16×16 super matrix. FIG. 2 illustrates a 16×16 super matrix that is made of 4 8×8 matrices. Each of the 8×8 matrices is made of the same A and B quadrants that have already been introduced. If each quadrant A contains two dots, and one wants to increase the gray level, there are 8 quadrant As eligible to receive a third dot. Dots are added one at a time to increase the dynamic range of the gray levels. Each quadrant A receives a third dot before the first one gets a fourth dot. This scheme expands the 64 possible levels of gray available in an 8×8 matrix to be 256 levels of gray using a 16×16 super matrix, but the super matrix retains the apparent resolution of an 8×8 matrix.

Not all 256 available levels of gray are used. At 600 DPI, if any of the quadrant As have at least one dot, all of the quadrant As must have at least one dot or the resulting gray pattern appears too coarse. At 1200 DPI, some engines have difficulty printing a single dot, so the dot cluster may start with two dots for the lightest shade available.

Now that a dither matrix has been roughed out, gray ramps are printed and the amount of light reflected from each level of gray is carefully measured. This data is used to make final adjustments on the dither matrix to obtain device best halftones that produce linear gray ramps. There may be some levels of gray in the middle tones that do not have enough shade difference to utilize all 8 steps that are available and remain linear. For these reasons, it is typical to utilize about 240 of the possible 255 levels of gray available in a 16×16 dither matrix. The contrived dither matrix used in this preferred embodiment has not been fine tuned, and the dither matrix used to print comparison images in Appendix A is a final matrix in a shipped product. When comparing the images in Appendix A printed by the contrived dither matrix to the control images, there may be lighter or darker areas that are not intrinsic problems of the contrived dither matrix, but are a result of not having the matrix linearized.

Figure 3:
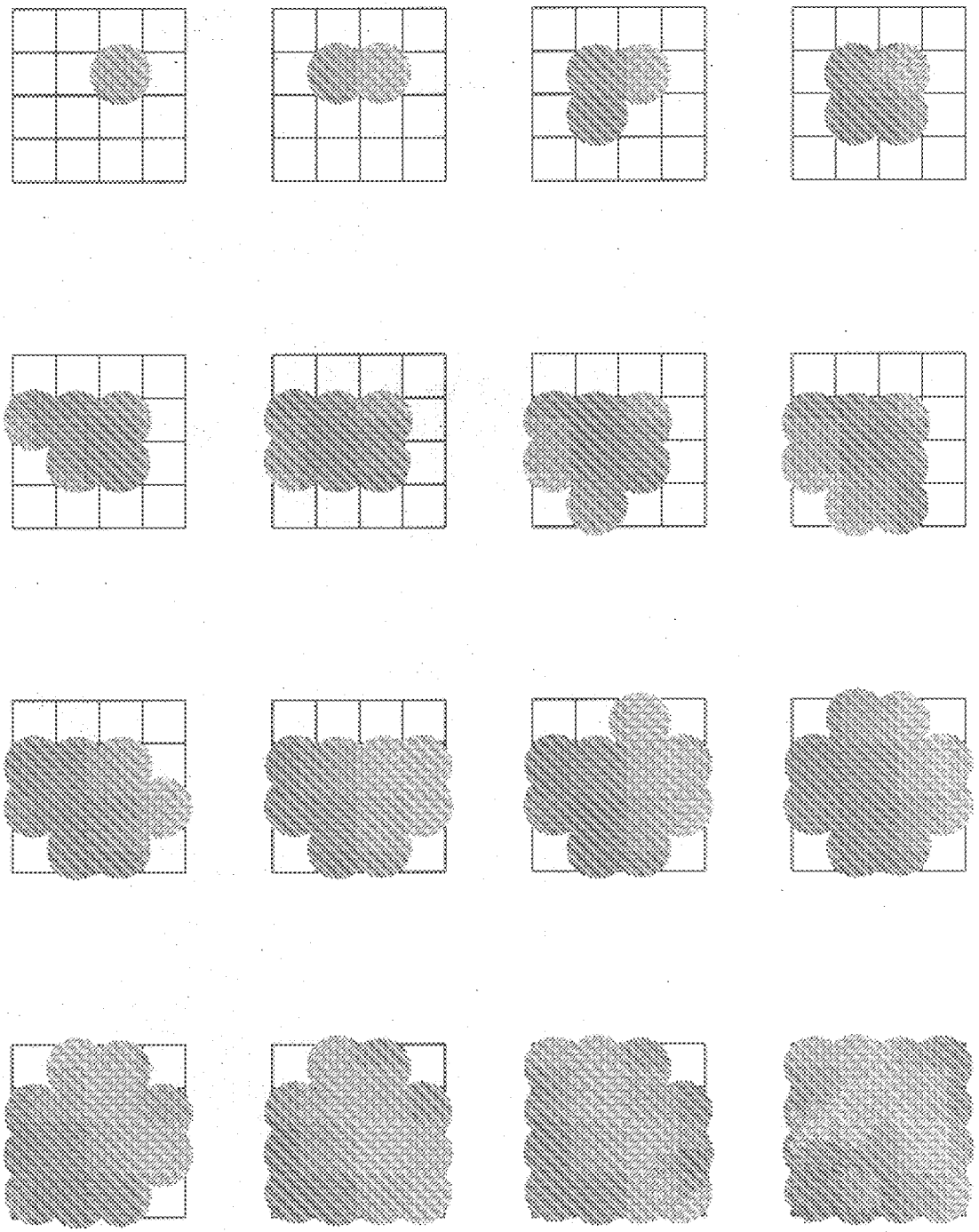
FIG. 3 shows quadrant A for typical dither matrix.

FIG. 3 illustrates the dot pattern for quadrant A that is typically used in Hewlett-Packard LaserJet® printer drivers to dither images. This dither matrix was developed to closely emulate halftoning used in the printing industry. When light shades are printed, the dot grouping in quadrant A emulates a round circle centered in the quadrant. Since there are only 16 dots in the quadrant, round dot clusters cannot be closely emulated. Once the entire quadrant is full, quadrant B begins to be filled in the pattern illustrated in FIG. 5. Each quadrant B is bordered by a quadrant A on the top, bottom, left, and right (FIG. 2), so quadrant B can be thought of as emulating a white circle. As quadrant B fills with dots (FIG. 5) the emulated white circle shrinks until black is obtained when all dots are filled in the A and B quadrants.

Figure 4:
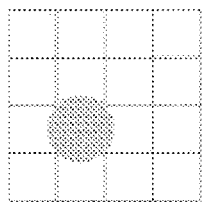
FIG. 4 shows quadrant A for contrived dither matrix.
Figure 4:
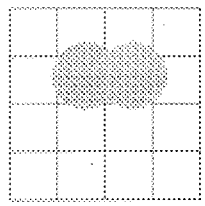
Figure 4:
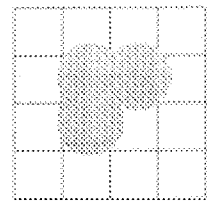
Figure 4:
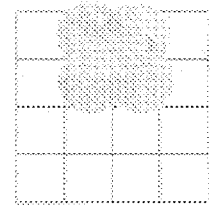
Figure 4:
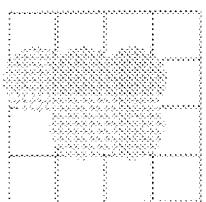
Figure 4:
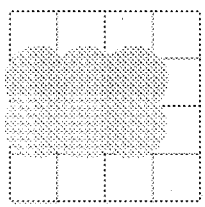
Figure 4:
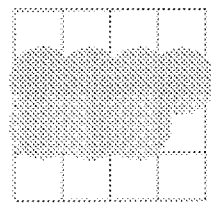
Figure 4:
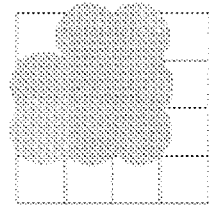
Figure 4:
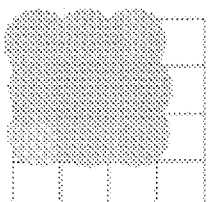
Figure 4:
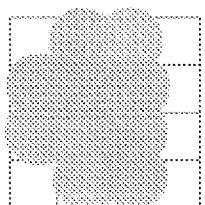
Figure 4:
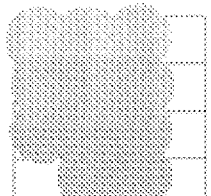
Figure 4:
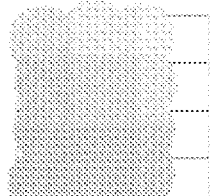
Figure 4:
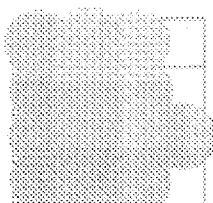
Figure 4:
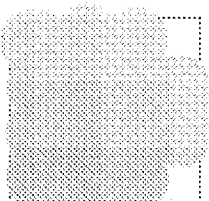
Figure 4:
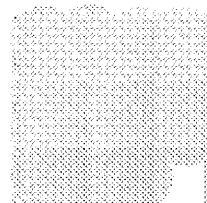
Figure 4:
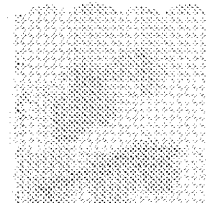
Figure 6:
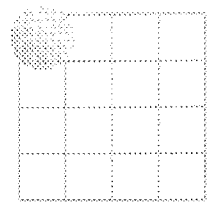
FIG. 6 shows quadrant B for contrived dither matrix.
Figure 6:
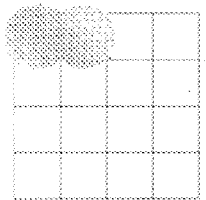
Figure 6:
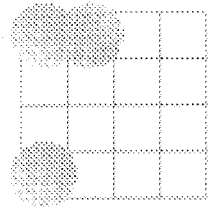
Figure 6:
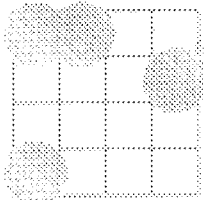
Figure 6:
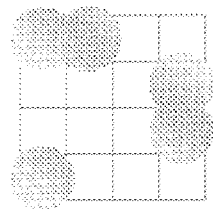
Figure 6:
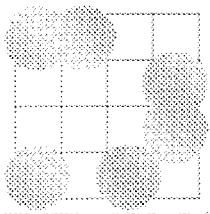
Figure 6:
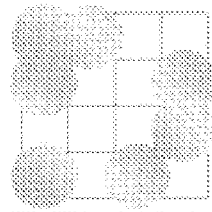
Figure 6:
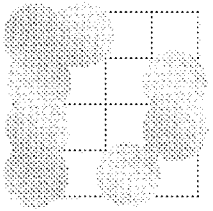
Figure 6:
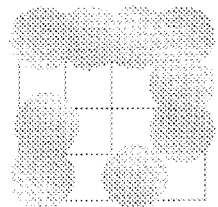
Figure 6:
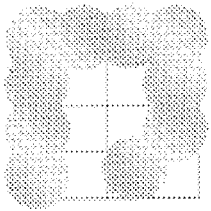
Figure 6:
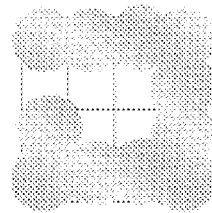
Figure 6:
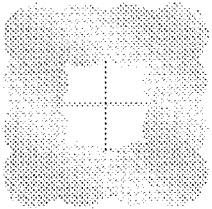
Figure 6:
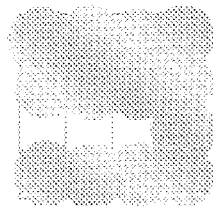

FIGS. 4 and 6 illustrate the contrived dot pattern for quadrant A and B that the preferred embodiment uses. Note that the dither matrix has been contrived so that each row for quadrants A and B is restricted to four bit patterns, one pattern has no dots, one pattern has four dots, and the remaining two patterns for each line contains 1, 2, or 3 dots. This restriction enables the four patterns for each row of the quadrants to be indexed with a two bit index. This restriction and the use of the two bit index rather than having to specify a four bit pattern is central to the operation of the compression algorithm. When an image is dithered, most of the dot patterns generated are taken directly from the patterns supplied by the dither matrix, which can be indexed, reducing the amount of data needed to represent the printed pattern. There are situations when the printed pattern will not match the dither matrix. As gray levels change in the source image, those changes are reflected in the destination image as well.

Consider the example of an image that has a vertical black hairline that is drawn against a light gray background. In this example, the hairline is 1/600 inches thick and the printer is a 600 DPI printer, so the destination image contains a line that is one pixel wide. Wherever that line exists in the destination image, the dithering process uses the dither matrix value for black, which is all dots on. Whenever the line passes through a 4×4 quadrant, the pixels that it occupies has dots turned on. Each line of the 4×4 matrix has the dots created by the line in addition to any dots caused by the background gray value. The resulting dot pattern may or may not match one of the indexed patterns specified by the contrived dither matrix. This problem may occur whenever an edge caused by the source image intrudes in the dither matrix of the destination image, which can be a common occurrence. The compression algorithm must be able to handle patterns that do not have an index in order to maintain image fidelity, or hairlines may be lost and edges blurred. In addition to using indexes to specify expected patterns, the compression algorithm is able to specify literal patterns of four bit length to solve this problem.

Figure 5:
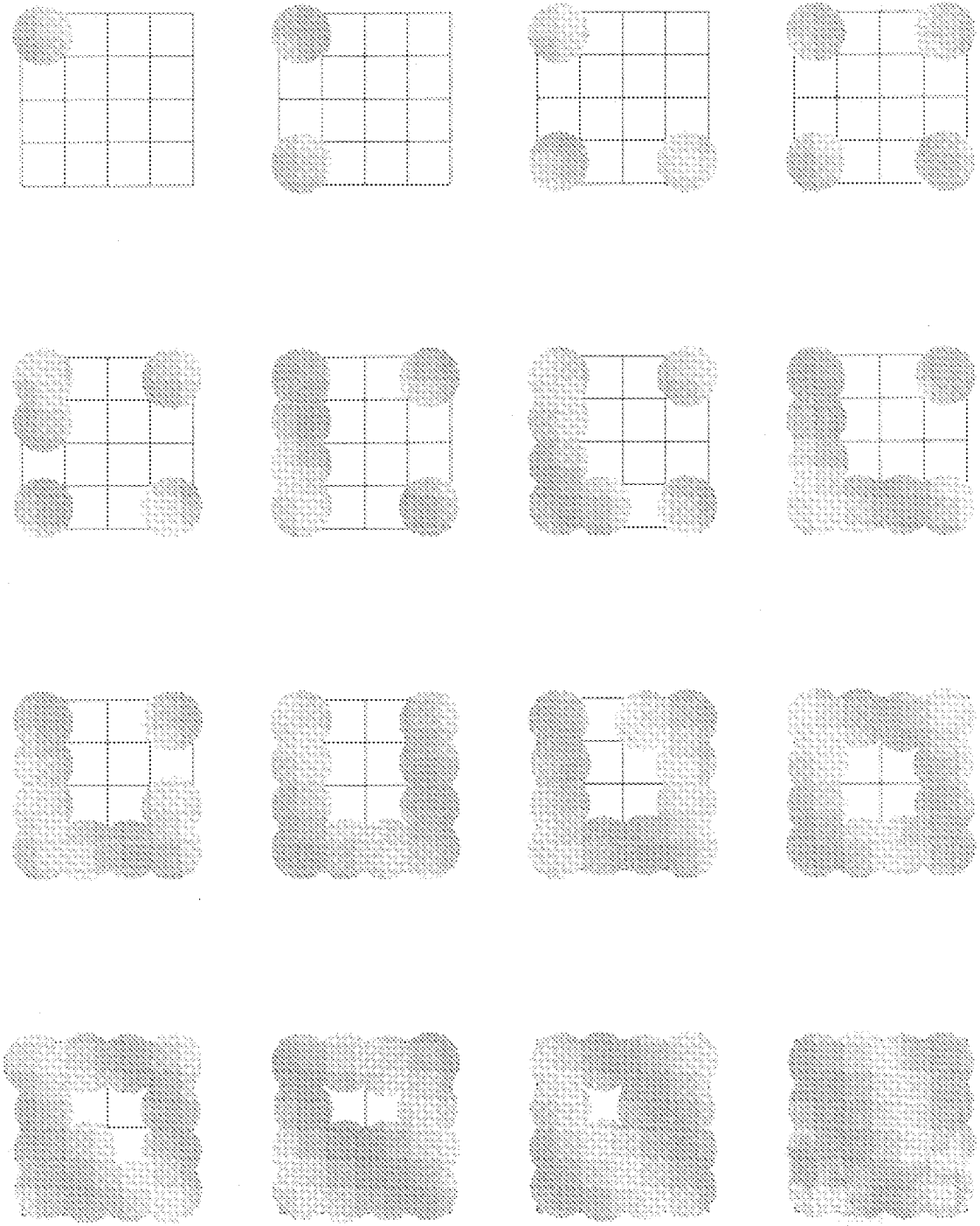
FIG. 5 shows quadrant B for typical dither matrix.

Comparing FIGS. 3, 4, 5, and 6, notice the similarities between the current dither matrix and the contrived dither matrix. They both have similar numbers of gray levels available, and they both emulate conventional halftoning using a 45 degree screen angle. FIGS. 3 and 5 make a cleaner emulation of a circle than FIGS. 4 and 6, but as described, these shapes are both reduced to amorphous blobs by the print process. Both methods share the advantage of being deterministic and ROP compatible. The main difference is that the contrived matrix in FIGS. 4 and 6 is designed so that a four bit pattern can be indexed by two bits when the pattern is not distorted by an edge in the image.

It is clear that the contrived dither matrix does not emulate halftoning as well as current dithering method, so it is reasonable to expect an image quality degradation. The amount of quality degradation cannot be predicted, so the most valid test is to implement the contrived dither matrix and print images to compare. After comparing the images, it may be necessary to optimize the contrived dither matrix and repeat the process. FIGS. 8 through 13 are images that were printed using the contrived dither matrix and the same images printed with the matrix found in the Windows® driver for the LaserJet® 5/5M.

With the contrived dither matrix now defined, the compression process will now be described. In the preferred embodiment, each compressed line has a sync byte followed by image data. There are four types of image data: predicted row, literal, indexed, and RLE (run length encoded) compressed index. Each type represents one or more nibbles of image data, but they are not consecutive destination nibbles. The dither matrix for the preferred embodiment is a 16×16 pixel matrix (FIG. 2) that is composed of four 8×8 sub matrices. Each of the 8×8 matrices are composed of two quadrant As and two quadrant Bs. Given an example where the entire line is printed with the same level of gray and the dithered line starts at the beginning of quadrant A. In this case, the pattern A, B, A, B, A, B, . . . is repeated across the page for the entire line. The 16×16 dither matrix enables an expansion of the number of gray levels, the first A need not match the second A, and the first B need not match the second B. The first A will match the third, fifth, seventh, and every odd numbered A contained in the line. The second A will match all the even numbered A quadrants. The same is true for the B quadrants. The compression algorithm splits the dithered image into four strings: the odd numbered As, the odd numbered Bs, the even numbered As, and the even numbered Bs. The elements of each string will be one nibble (four bits) long. Labeling the four strings S1 (String 1), S2 (String 2), S3 (String 3), and S4 (String 4) then a final decompressed line of image data is composed of data from the sync byte, then four bits from S1, four bits from S2, four bits from S3, four from S4, four bits from S1, four bits from S2, and so on until enough data has been sent to completely describe the destination line. The compressed line that is sent to the printer has the sync byte, all data for S1, followed by all data for S2, S3, and S4. This allows each string to be compressed independently, and the decompressed results of each string are interleaved by the decompressor.

When S1, S2, S3, and S4 are compressed, they describe image data using control bytes and data bytes. Control bytes are used to control the decompressor, data bytes are data to be decompressed. Since the strings are compressed independently, each string has its own set of control and data bytes. A control byte describes the format for the next segment of image data. A control byte also describes the amount of compressed data that belongs to the control byte. When the number of data bytes specified in the control byte has been decompressed into image data, the next byte in the stream of compressed data is a control byte. Depending on the control byte format, data bytes are not always needed, so consecutive control bytes are allowed.

It is permissible for S1 through S4 to specify too much data for a line. Data that falls outside of the specified line length should be ignored by the decompressor.

In order for the index values to have meaning, the compressor and decompressor must each have a copy of dither tables to code and decode the index values. These table values describe the contrived dither matrix. The preferred embodiment contrived dither matrix uses the values for quadrant A and quadrant B as shown in Table 1 and 2 respectively.

TABLE 1

| QUADRANT A | Index (0) | Index (1) | Index (2) | Index (3) |
| --- | --- | --- | --- | --- |
| First Line | 0x00 (bit pattern 0000) | 0x06 (bit pattern 0110) | 0x0E (bit pattern 1110) | 0x0F (bit pattern 1111) |
| Second Line | 0x00 (bit pattern 0000) | 0x06 (bit pattern 0110) | 0x0E (bit pattern 1110) | 0x0F (bit pattern 1111) |
| Third Line | 0x00 (bit pattern 0000) | 0x04 (bit pattern 0100) | 0x0E (bit pattern 1110) | 0x0F (bit pattern 1111) |

TABLE 1-continued

| QUADRANT A | Index (0) | Index (1) | Index (2) | Index (3) |
| --- | --- | --- | --- | --- |
| Fourth Line | 0x00 (bit pattern 0000) | 0x06 (bit pattern 0110) | 0x0E (bit pattern 1110) | 0x0F (bit pattern 1111) |

TABLE 2

| QUADRANT B | Index (0) | Index (1) | Index (2) | Index (3) |
| --- | --- | --- | --- | --- |
| First Line | 0x00 (bit pattern 0000) | 0x08 (bit pattern 1000) | 0x0C (bit pattern 1100) | 0x0F (bit pattern 1111) |
| Second Line | 0x00 (bit pattern 0000) | 0x01 (bit pattern 0001) | 0x09 (bit pattern 1001) | 0x0F (bit pattern 1111) |
| Third Line | 0x00 (bit pattern 0000) | 0x01 (bit pattern 0001) | 0x09 (bit pattern 1001) | 0x0F (bit pattern 1111) |
| Fourth Line | 0x00 (bit pattern 0000) | 0x08 (bit pattern 1000) | 0x0A (bit pattern 1010) | 0x0F (bit pattern 1111) |

The correct table and line number are calculated based on the Sync Byte and position within the line. The correct bit pattern is retrieved using the index that has a value of 0 through 3.

Figure 7:
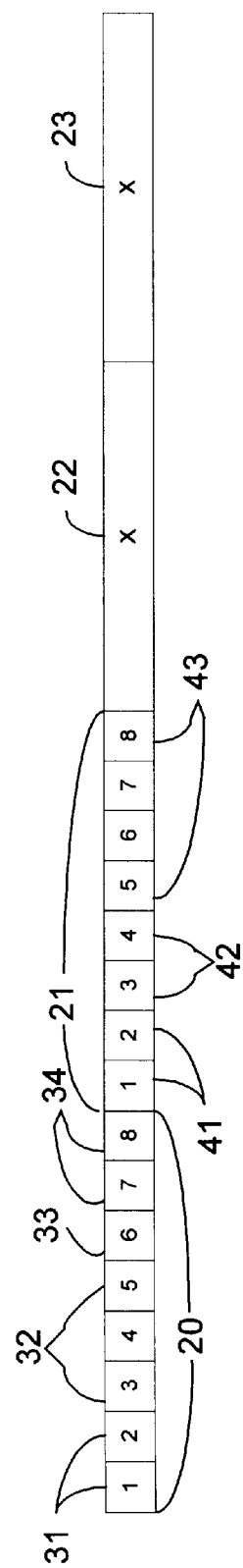
FIG. 7 shows an exemplary data stream produced in accordance with the present invention.

Each compressed line of data starts with Sync Byte 20 as shown in FIG. 7. The dither matrix has a page oriented anchor point. The purpose of Sync Byte 20 is to specify how the dithered image is synchronized to the dither matrix. The image and the dither matrix must be in synchronization in order for the dither table entries to match the dithered image. Each dither table entry is 4 pixels wide, thus there can be a dithering displacement of 0 to 3 pixels. This dithering displacement means that the image has started at the current active position, but the image will not encounter the beginning edge of a dither table entry for 0 to 3 pixels. There is no means to compress or decompress the 0 to 3 pixels, however, data that starts the line fits within the sync byte. Once the decompressor has extracted the 0 to 3 pixels from the Sync Byte, it is ready to decompress and interleave data from S1 through S4 to compose a line of dithered, uncompressed image data. The dither table used first is specified by the next bit of the Sync Byte. The last two bits of the Sync Byte specify which of the four lines of table A or table B are to be used for the entire line of uncompressed data.

Specifically, in the preferred embodiment, Sync Byte 20 is 8 bits of data. High order bits 1 and 2 (31) specify a dithering displacement. The range of values are 0 through 3 and specify a displacement of 0 through 3 pixels. Bits 3, 4 and 5 (32) specify uncompressed pixels to fill the dithering displacement that starts the line of data. The number of these pixels that will actually be used is the value of the dithering displacement. If the dithering displacement has a value of 0, then no data will be extracted from bits 3, 4, and 5. If the dithering displacement has value 1, then bit 3 is the value of the pixel that starts the uncompressed line. If the dithering displacement has value 2, then the values of bits 3 and 4 will be the pixels that start the uncompressed line. Finally, if the dithering displacement has value 3, then the uncompressed line will start with pixels of the same value as bits 3, 4, and 5.

Bit 6 (33) specifies if the current line starts with table A or table B for retrieving index values. Zero (0) specifies that the current line starts with table A and one (1) specifies that the current line starts with table B.

Bits 7 and 8 (34) specify which line within table A or table B is to be used for the current line. The range of possible values is 0 through 3, specifying the first line through the fourth line.

When one of the strings S1 through S4 are compressed, the compressed string starts with a Control Byte (21). Control Byte 21 specifies how the next segment of uncompressed data will be obtained. If Control Byte 21 is for a literal run or indexed run, then the control byte specifies how much data follows the control byte. Sometimes, there will be a carry byte indicated, and the data that follows the control byte will be followed by a carry byte that specifies more data bytes. When all the specified data bytes are decompressed, then the next byte is a control byte or the end of the line. If the control byte is for a predicted row or RLE compressed indexed run, then no data bytes follow and the next byte is another control byte or the end of the line. The end of the line is reached when enough data has been decompressed to fill the image width.

The image width, height, and position are defined by a printer command that is sent to the printer prior to any raster data for the image. Image width is specified in pixels, and compressed data is specified in nibbles, so there may be 1 to 3 extra pixels of uncompressed data. Only the data that falls within the image width should be considered as valid, and the extra pixels, if any, should be ignored.

In the preferred embodiment bits 1 and 2 (41) of Control Byte 21 specify the type of control byte. The ranges of values are 00 through 11. The format values are 00 for a predicted row run of nibbles, 01 for a literal run of nibbles, 10 for an indexed run of nibbles, or 11 for an RLE compressed run of indexed nibbles. The lower six bits of a control byte are dependent on the control byte function, which is described next. A Control Byte may or may not contain image data.

Predicted row run data utilizes the similarity of the current row of dithered image data to a row 8 lines earlier. This similarity originates from the nature of images, scaling images up, and the pattern imposed by the dither matrix. The compressor buffers 8 lines of output data for this comparison, if the current line is within 8 lines of the start of the image, then the early row is considered to be all zeros. The compressor examines the row of data 8 lines back and if the data exactly matches the current data, then that data is eligible to be compressed as a predicted row run. The row of data 8 lines back will contain data that does not match, but much of the old row will be exactly correct. Predicted row data is not actually sent to the printer. The control byte instructs the decompressor to copy a specified number of nibbles from the line it decompressed 8 lines earlier and use that data in the current line. All the areas where the predicted row does not match the current line data will be compressed using other control byte formats. This works well because the number of nibble patterns generated while dithering is limited by the contrived dither matrix. This affects the probability of bit patterns used for each dithered nibble, so the probability of finding an exact match of the nibble bit patterns is enhanced. Vertical edges that extend for 8 rows or more that would otherwise cause a literal run may be eligible for compression by the predicted row method.

During the development of this present invention, several alternatives were considered for the location of base data to extract predicted row data. Some of the alternatives were to look back 4 rows and over 4 pixels, to look back 8 pixels within the current row, to look back 8 rows, and to look back 16 rows. Looking back 16 rows was a good choice for images that are scaled up by more than a ratio of 16:1 because every row was guaranteed to match a row either back 16 lines or ahead 16 lines. The scheme of looking back 16 rows was rejected because images that are scaled that much already compress fairly well. Images that are scaled by a factor grater than 8 may also be sent as source images due to I/O load balancing. Looking back 4 lines and over 4 pixels did not compress very well for some levels of gray and did not take advantage of compressing vertical edges. Looking back 4 pixels or back 8 pixels on the same line did not add considerably to the overall compression ratio because those situations were taken care of by RLE indexed control bytes. It was empirically determined that looking back 8 lines for the base line made the best choice for high resolution raster images. An alternative would be to use the scaling factor to determine the location of the base row of data for the compressor and decompressor. The base row would be 16 lines back for images that are scaled by a factor of 16 or more, and 8 lines back for all other images. This would make a good alternative for printers that are not capable of dithering raster images. For those products, all images are scaled and dithered by the driver, regardless of scaling factor.

The upper two bits (41) of a Predicted Row Run Control Byte 21 are 00 (41). The next 6 bits (42 and 43) of a Predicted Row Run control byte contain a counter, which ranges from 0 through 63, representing 1 to 63 nibbles of predicted row data to follow. As described above, predicted row runs are used when the compressor has determined that there is an exact match between the present data and the base row for the indicated nibbles, and the decompressor can extract image data for the current row from the base row. If there are less than 3 nibbles of predicted row data, a different control byte format will be used. If the counter value is 63, then 63 nibbles of predicted row data will follow (same as if the counter value is 62), and the next byte in the data stream is a predicted row carry byte.

If a carry byte is present, all eight bits of the carry byte are used as a counter. The range of values for this counter is 0 through 255, indicating that 1 through 255 nibbles of data are to be extracted from the base row at the current X position and used in the current row. If the value of the counter is 255, then there are 255 nibbles and the next byte in the data stream is also a carry byte of the same format as this one.

If the upper two bits of Control Byte 21 are 01 (41) then a Literal Run is indicated. In a literal run, the lower 6 bits (42 and 43) of Control Byte 21 are split into two fields. The first field 42 is a two bit count field with values 0 through 3, indicating 1 to 3 nibbles of literal data to follow, plus a carry indicator. When the nibble count field (42) is 0, the literal nibble 43 is contained in the Control Byte 21. When the nibble count field (42) is 1, the first nibble 43 is contained in Control Byte 21, and the second nibble is in the high order bits of data byte 22 following the Control Byte 21. The low order bits of data byte 22 are not used when the nibble count field 42 is 1. When the nibble count field 42 is 2, the first nibble 43 is contained in Control Byte 21, the second nibble is in the high order bits of a following data byte 22 and the third nibble is in the low order bits of data byte 22. Finally, when the nibble count field 42 is 3, a carry condition exists, and there are three nibbles of image data as described when the nibble count field 42 is 2. The carry condition indicates that the byte 23 following the literal data byte 22 is a Literal Run Carry Byte. This Literal Run Carry Byte is 8 bits long and has value 0 through 255. Values 0 through 254 indicate that 1 through 255 nibbles of literal data follow the Literal Run Carry Byte, two nibbles in each byte of data. If the count is odd, then the low order nibble of the last data byte is not used. Value 255 is a carry condition that indicates 255 nibbles of literal data follow and the next byte is another Literal Run Carry Byte of the same format as just described.

Bits 5, 6, 7, and 8 (43) of the literal run control byte is a 4 bit literal data field. As described above, the first nibble of literal data is stored in this area. Literal runs are generally only created at the edge of objects within raster images, so the majority of literal runs are only 1 nibble in length. Literal runs of data are very expensive in terms of compression, because they have a negative compression ratio. The length of a literal run is the amount of literal data plus the overhead of the control information. If the majority of literal runs are indeed 1 nibble in length, then each of these nibbles will be expanded to a full byte when the data is compressed, resulting in a 1:2 expansion of data. However, as mentioned before, literal runs are needed to maintain image fidelity.

If the upper two bits 41 of Control Byte 21 are 10 then an Indexed Run is indicated. Given an Indexed Run, the lower 6 bits (42 and 43) of an Indexed Run Control Byte 21 have the values 0 to 63 that represent 1 to 64 bytes of indexed data to follow. Each byte of indexed data is 8 bits long, enough to represent 4 two bit indices. Since these are interleaved compressed strings, the indices in one compressed string are all for one dither table: either dither table A or dither table B. Three pieces of information are needed to decode an index and retrieve the correct pixel pattern. The decompressor needs to know what the current table is (S1 and S3 will use either dither table A or dither table B, and S2 and S4 will use the other of dither table A or dither table B), it needs the line number from the sync byte to get the correct line number for using the dither table, and it needs the dither table index from the data byte in the compressed data to get the correct dither table entry.

If the indexes in an indexed run are all the same within one or more data bytes, a compressed index form would be used. In order to minimize the impact of fragmenting literal runs by converting portions of them to RLE indexed runs, only data bytes that have four indices of the same value are converted. To indicate a compressed indexed, the upper two bits of the Control Byte 21 are 11. Image data is compressed into the lower 6 bits of the command byte. Of the six bits, the first two bits are the index number, the last four bits have a range of 0 to 15 to indicate 1 to 16 repeating data bytes. Each data byte contains four indices, and each index represents a nibble of decompressed data, so the maximum amount of data that can be represented by a single RLE compressed byte is 32 bytes of uncompressed data. RLE compressed indexed runs have no carry byte.

The compression results of this scheme were empirically determined by writing a test program that dithered using the contrived dither matrix as well as performed the image compression and decompression. The program accepts 8 bit per pixel color or grayscale DIBs and produces two 1 bit per pixel output DIBs. The input DIBs are 8 bits per pixel because current LaserJet® drivers convert color images to 8 bit per pixel grayscale images, so compression performance for 8, 24, and 32 bit per pixel color DIBs can be derived using 8 bit DIBs. There are two output DIBs, one of them is compressed using the new compression method, and the other is a 1 bit per pixel DIB that is uncompressed but dithered using the contrived dither matrix. The size of the output compressed DIB is compared to the size of the output uncompressed DIB to calculate the compression ratio. The uncompressed DIB can be printed by commercial application programs to produce printed output. This test compression program was written to be flexible in analyzing the compression algorithm compression ratios, not performance. It has the ability to have RLE indexed runs and predicted runs disabled in order to separate the effects of each type of compression run. No time measurements have been made regarding performance because the test version of the compression program is intentionally inefficient.

Test images are personal photographs that were sent to Kodak and scanned onto a Kodak Photo CD™. Six of the highest resolution (16*base) images were then selected and converted to 8 bit per pixel grayscale DIBs that are 3072 pixels wide by 2048 pixels high. Each image was selected for a specific reason. For each figure, the top image (i.e., FIG. Xa) was printed using the present invention while the bottom image was printed using the standard LaserJet® printer driver.

Figure 8A:
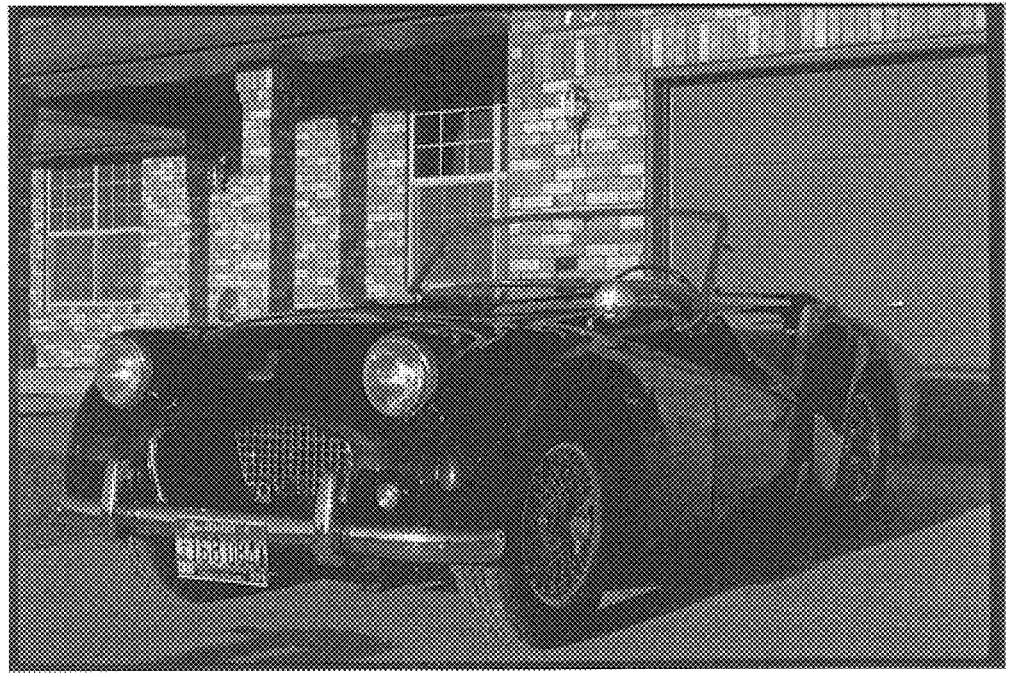
FIG. 8a is a picture of a sports car in driveway as generated by using the present invention.
Figure 8B:
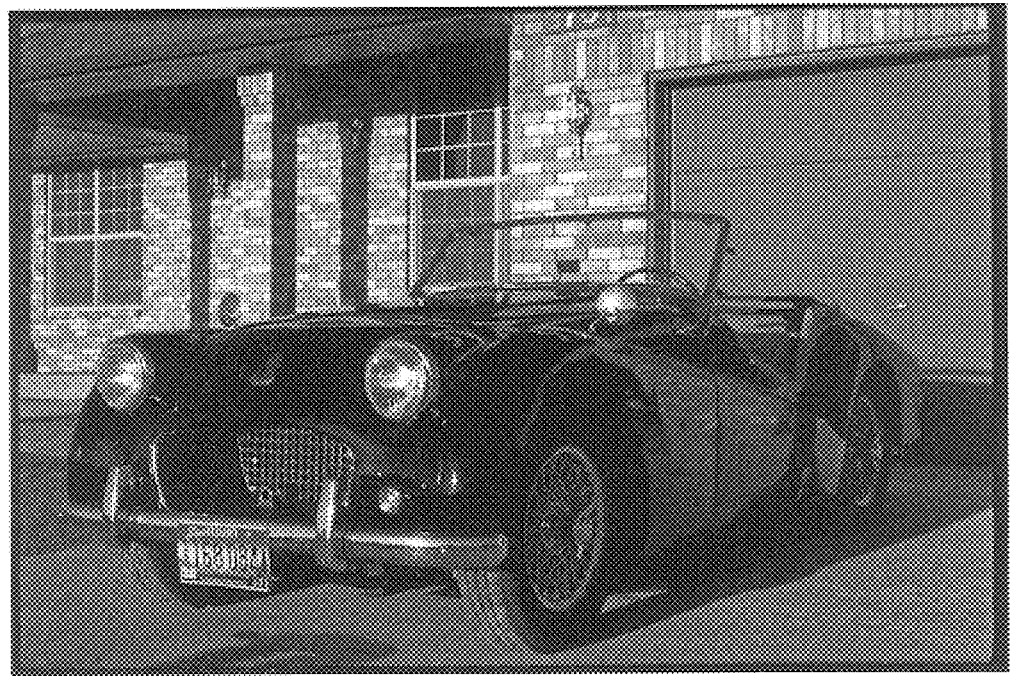
FIG. 8b is a picture of a sports car in driveway as generated by using the standard LaserJet® printer driver.

FIG. 8 has several interesting areas. Borders in the bricks and roof shingles provide insight to edge behavior of the dither matrix. The black car illustrated the behavior of the dither matrix for dark areas. The most interesting area of the image is the license plate. The bottom of the license plate has the phrase "FAMOUS POTATOES" that is nearly legible.

Figure 9A:
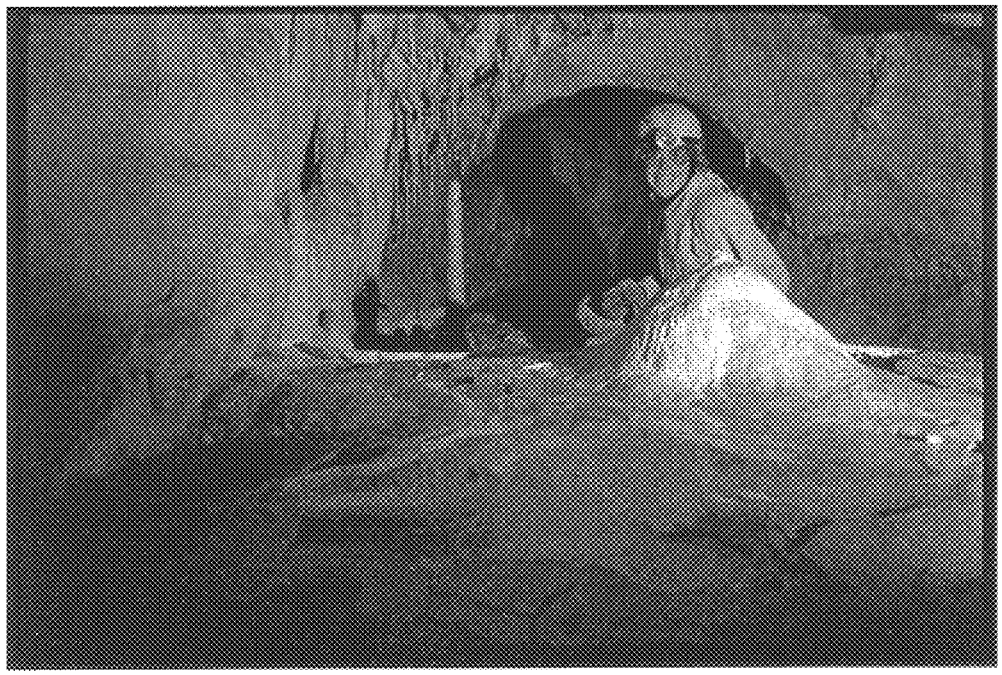
FIG. 9a is a picture of Beth in Cave as generated by using the present invention.
Figure 9B:
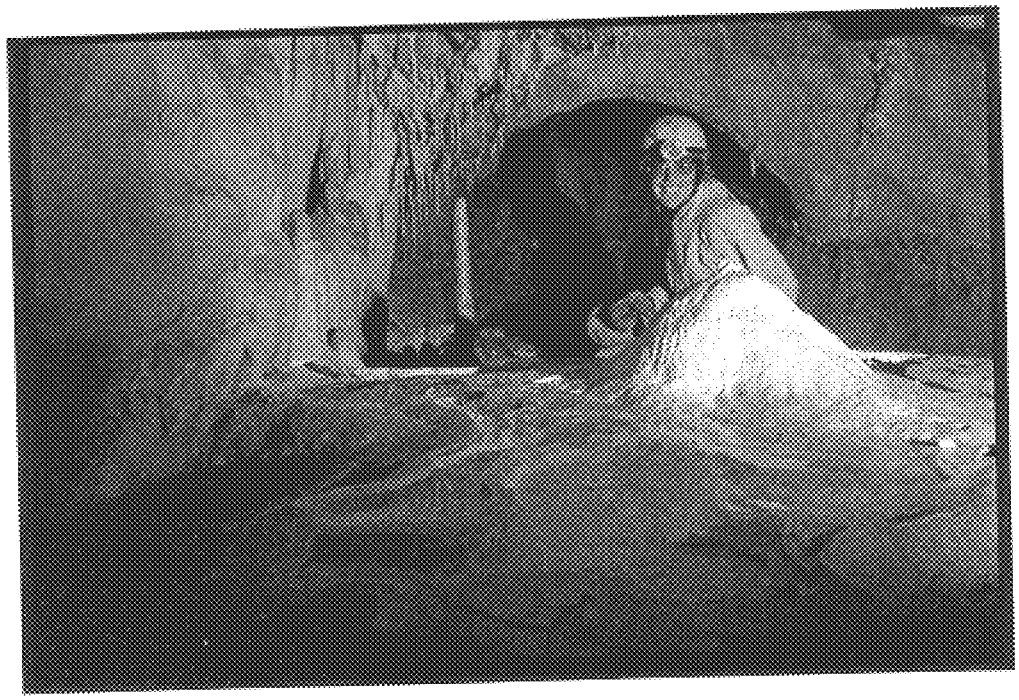
FIG. 9b is a picture of Beth in Cave as generated by using the standard LaserJet® printer driver.

FIG. 9 has large "soft" areas of light shades and dark tones.

Figure 10A:
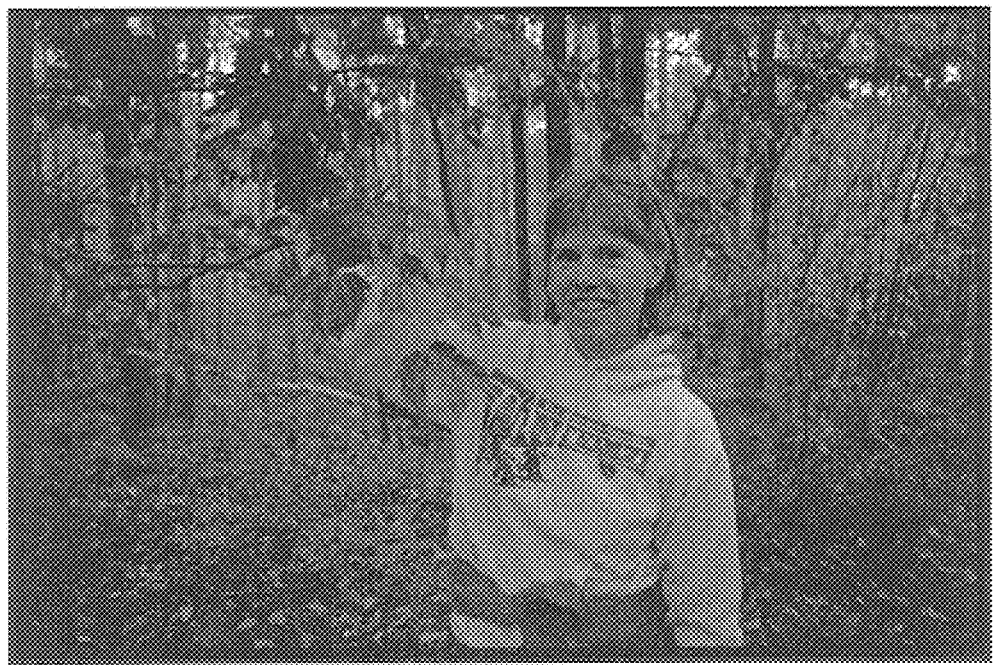
FIG. 10a is a picture of Beth in Autumn Trees as generated by using the present invention.
Figure 10B:
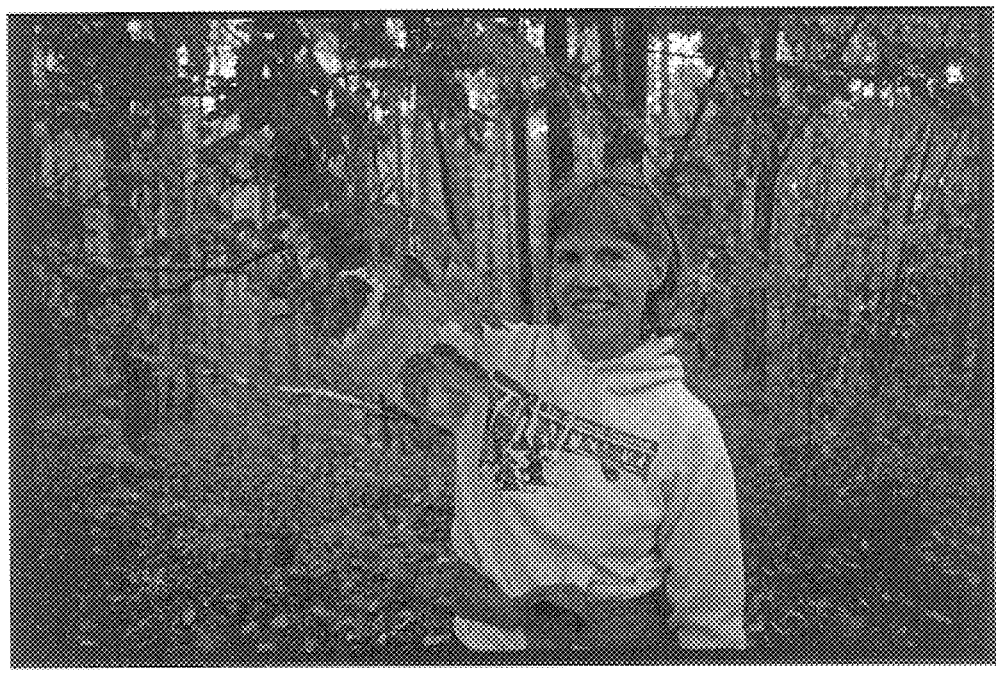
FIG. 10b is a picture of Beth in Autumn Trees as generated by using the standard LaserJet® printer driver.

FIG. 10 has a lot of high frequency areas in the leaves and branches.

Figure 11A:
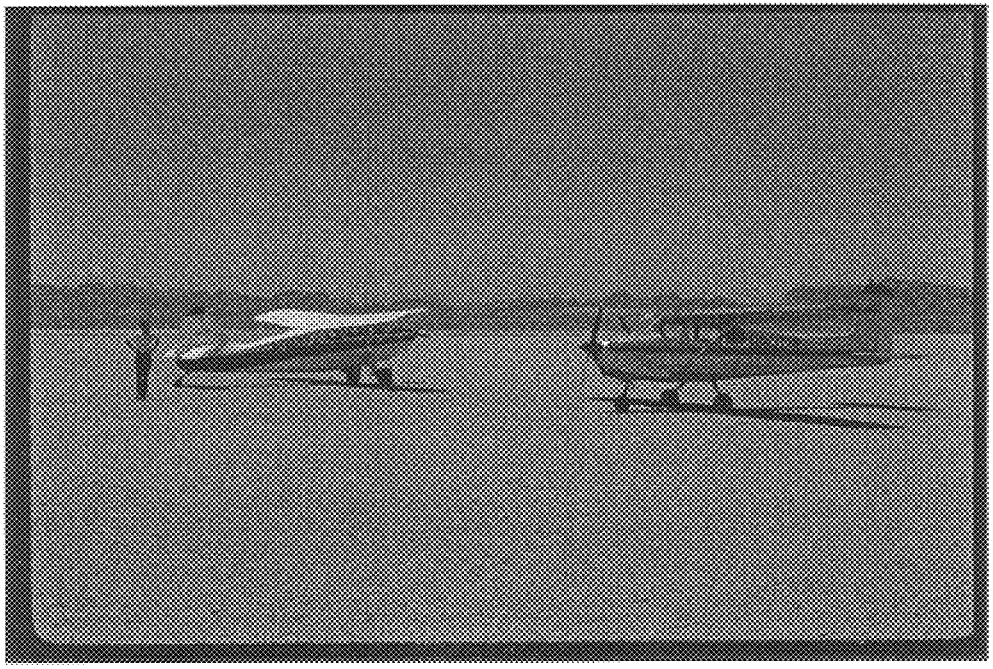
FIG. 11a is a picture of planes on dry lake bed as generated by using the present invention.
Figure 11B:
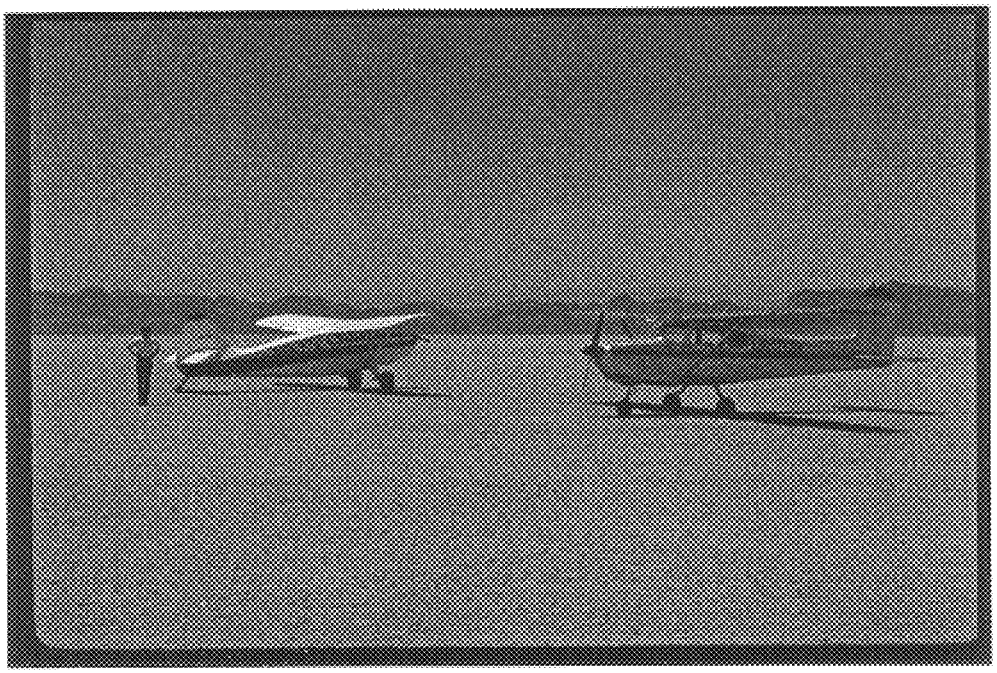
FIG. 11b is a picture of planes on dry lake bed as generated by using the standard LaserJet® printer driver.

FIG. 11 is included to show the subtle tones in the sky and desert, and edges in the planes and mountains. This image was also selected because the similar levels of gray in the sky and desert should be quite compressible.

Figure 12A:
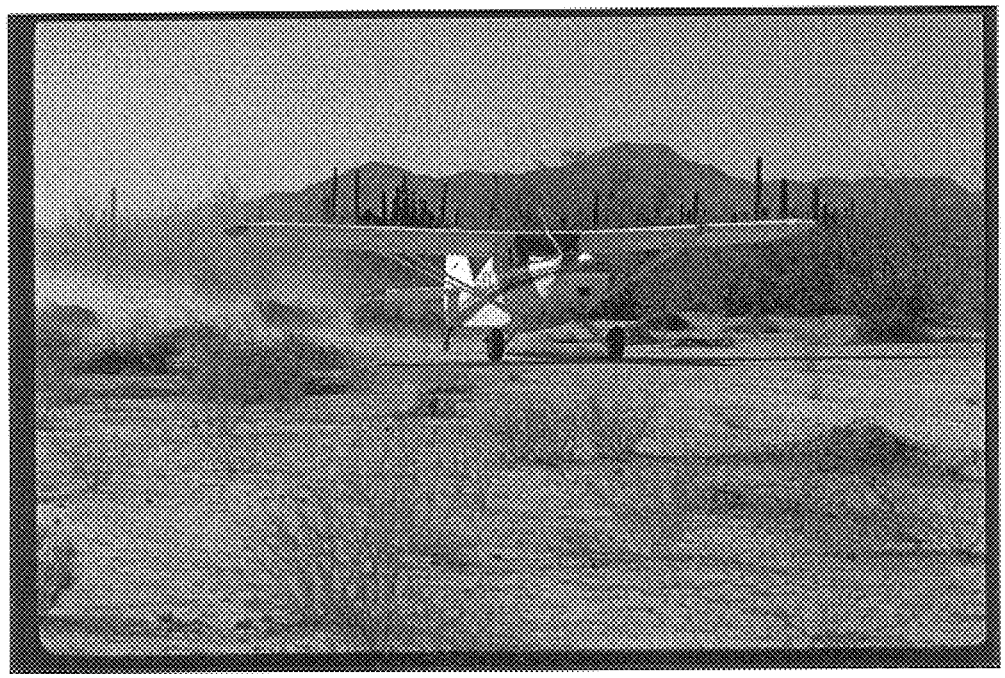
FIG. 12a is a picture of plane taking off in desert as generated by using the present invention.
Figure 12B:
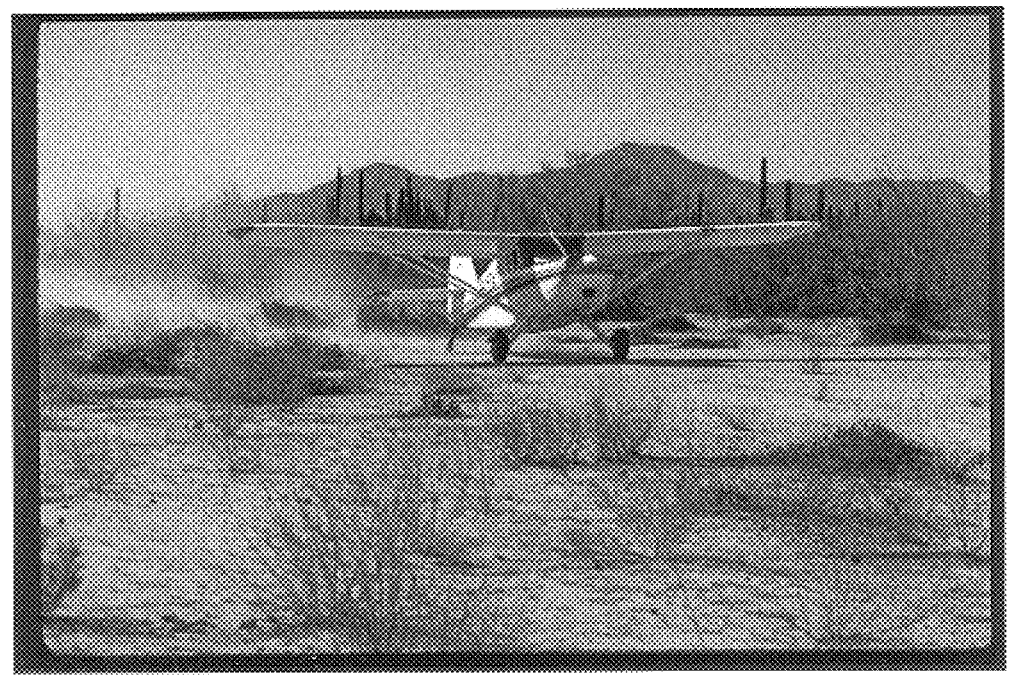
FIG. 12b is a picture of plane taking off in desert as generated by using the standard LaserJet® printer driver.

FIG. 12 has mid tone edges of the bushes in the foreground and subtle information of the dust behind the plane made by the prop wash.

Figure 13A:
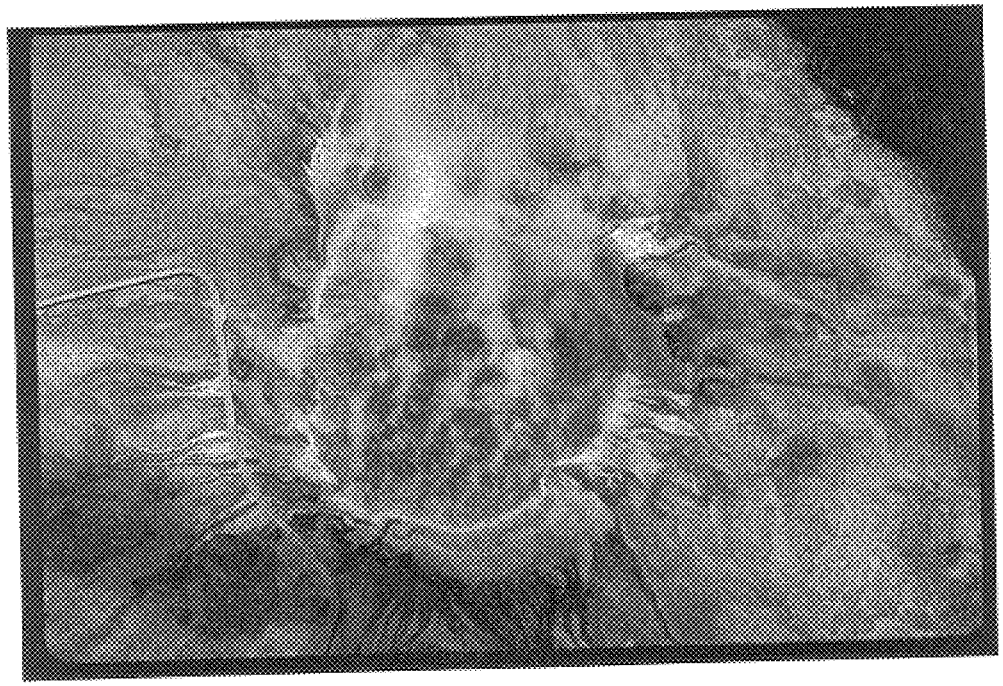
FIG. 13a is a picture of an aerial view of Grand Prismatic pool as generated by using the present invention.
Figure 13B:
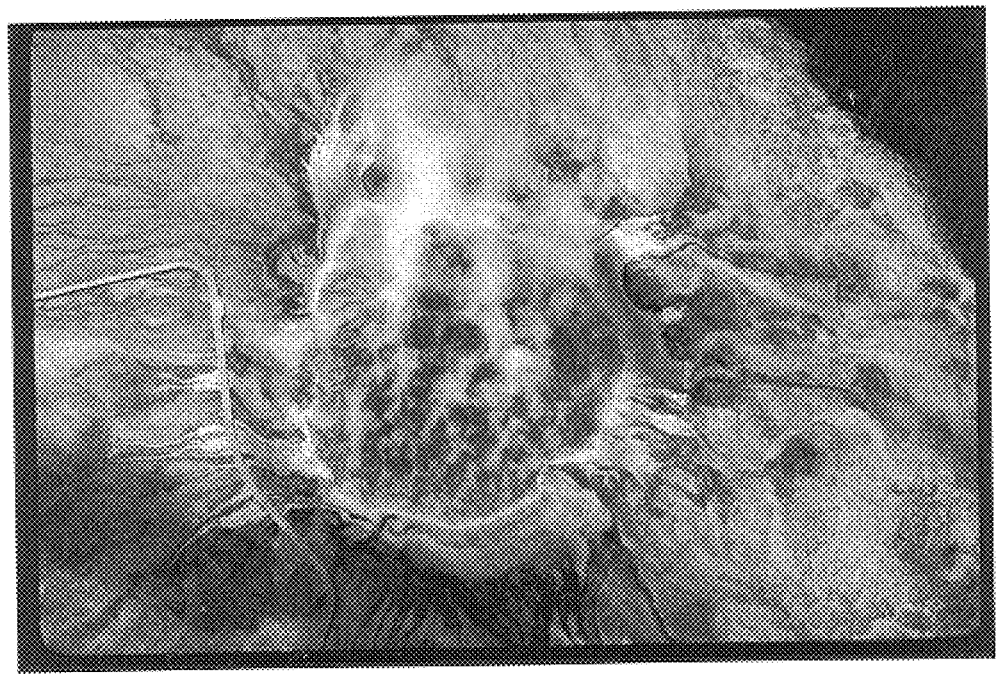
FIG. 13b is a picture of an aerial view of Grand Prismatic pool as generated by using the standard LaserJet® printer driver.
Figure 14:
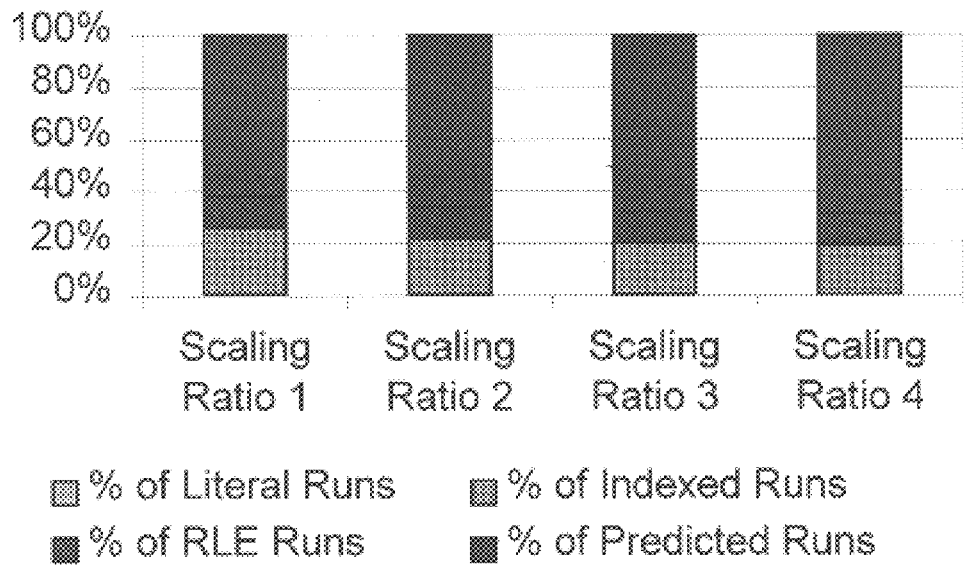
FIG. 14 shows the decomposition of the dithered image of FIG. 8.
Figure 15:
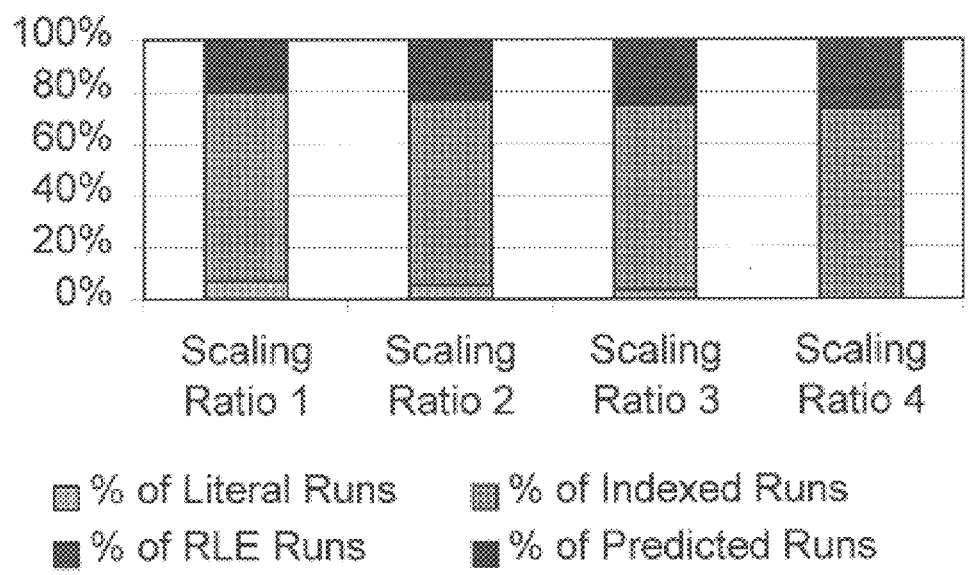
FIG. 15 shows the composition of compressed data file for the image of FIG. 8.
Figure 16:
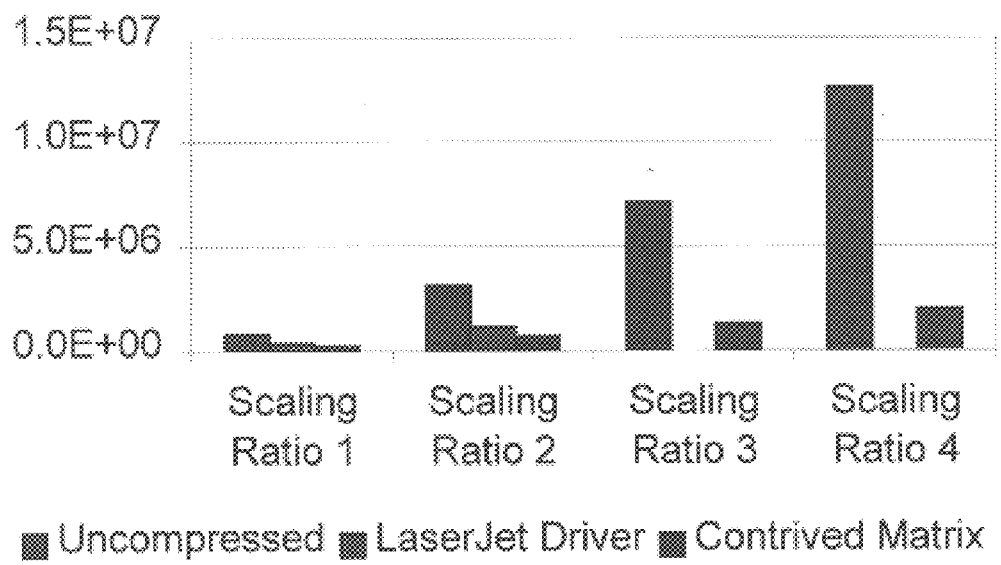
FIG. 16 shows a graph of the data sizes for the image of FIG. 8.
Figure 17:
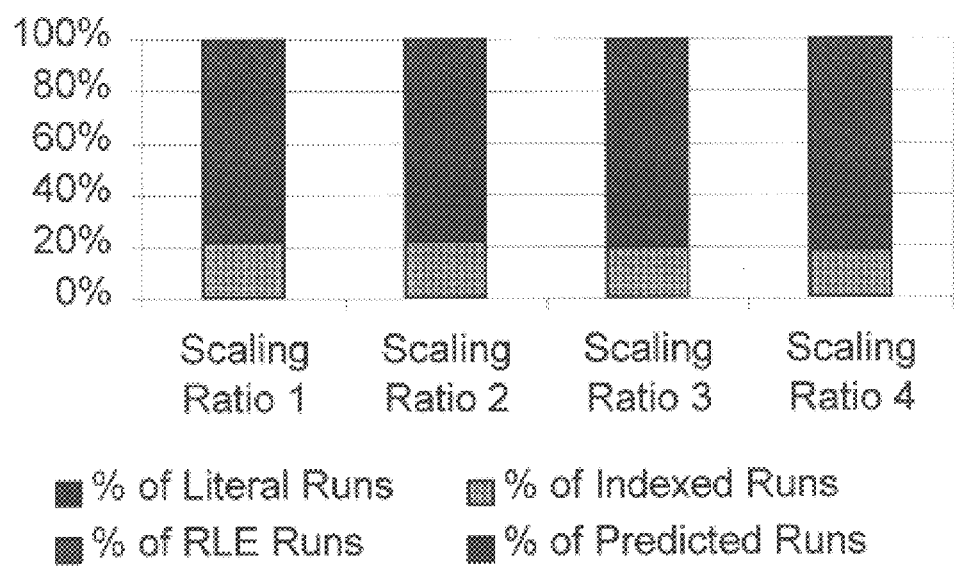
FIG. 17 shows the decomposition of the dithered image of FIG. 9.
Figure 18:
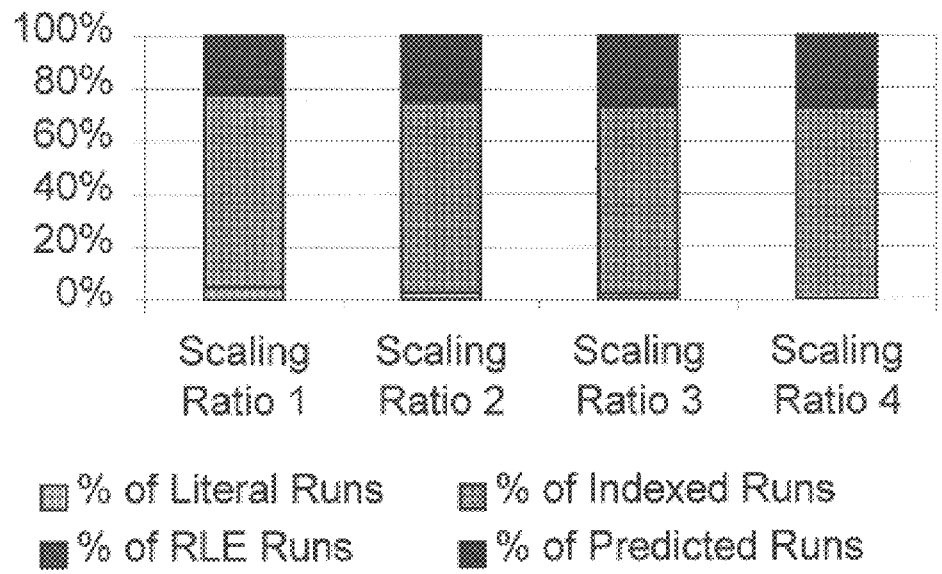
FIG. 18 shows the composition of compressed data file for the image of FIG. 9.
Figure 19:
FIG. 19 shows a graph of the data sizes for the image of FIG. 9.
Figure 20:
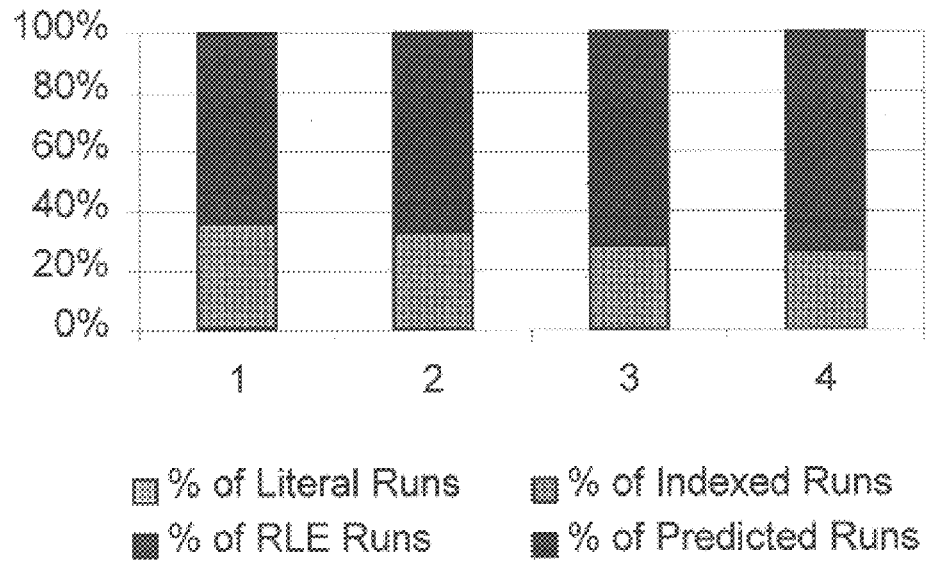
FIG. 20 shows the decomposition of the dithered image of FIG. 10.
Figure 21:
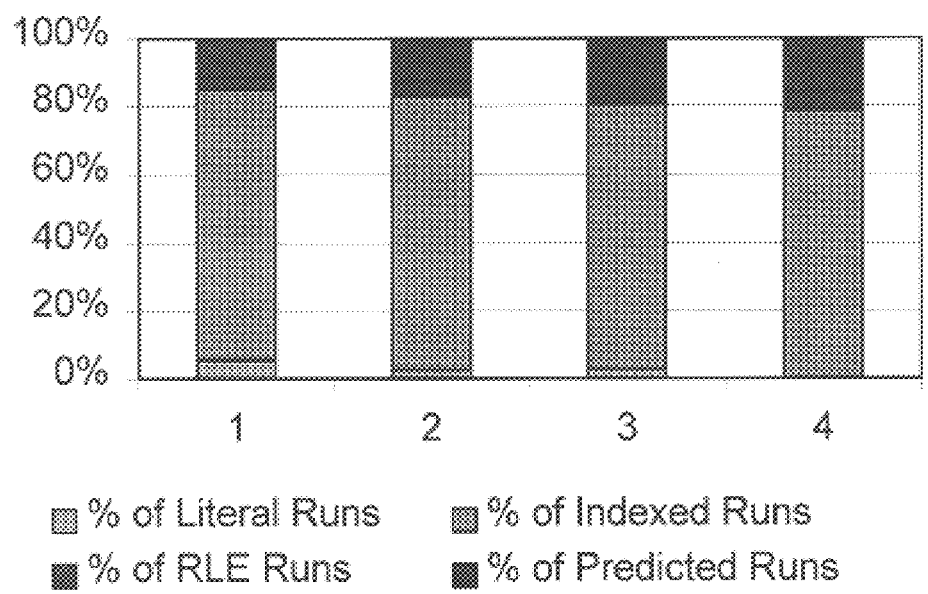
FIG. 21 shows the composition of compressed data file for the image of FIG. 10.
Figure 22:
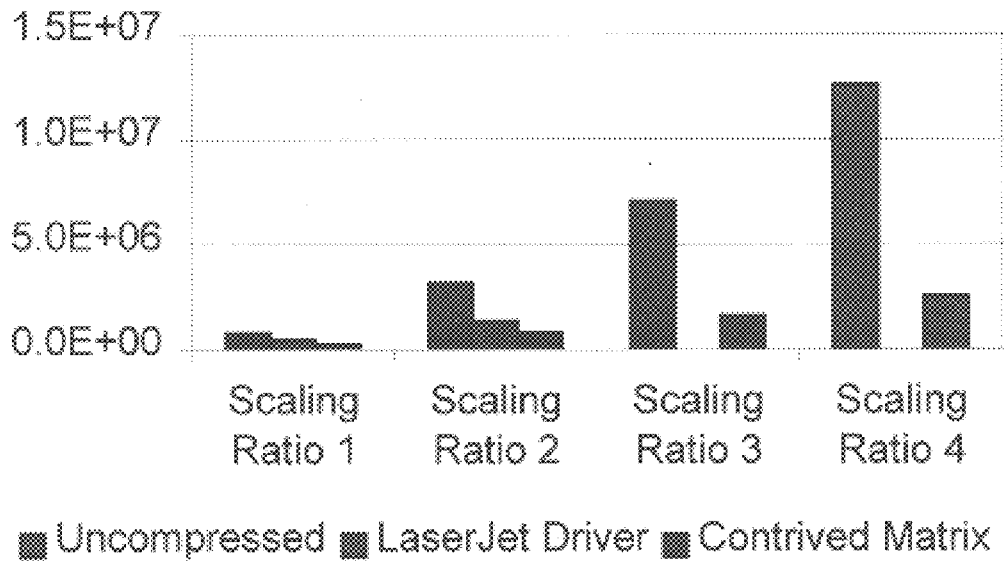
FIG. 22 shows a graph of the data sizes for the image of FIG. 10.
Figure 23:
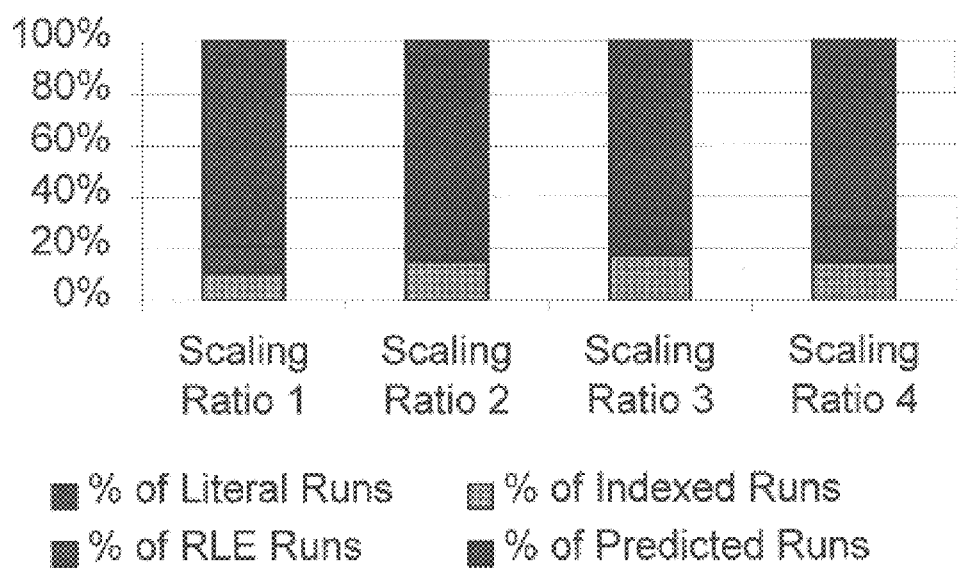
FIG. 23 shows the decomposition of the dithered image of FIG. 11.
Figure 24:
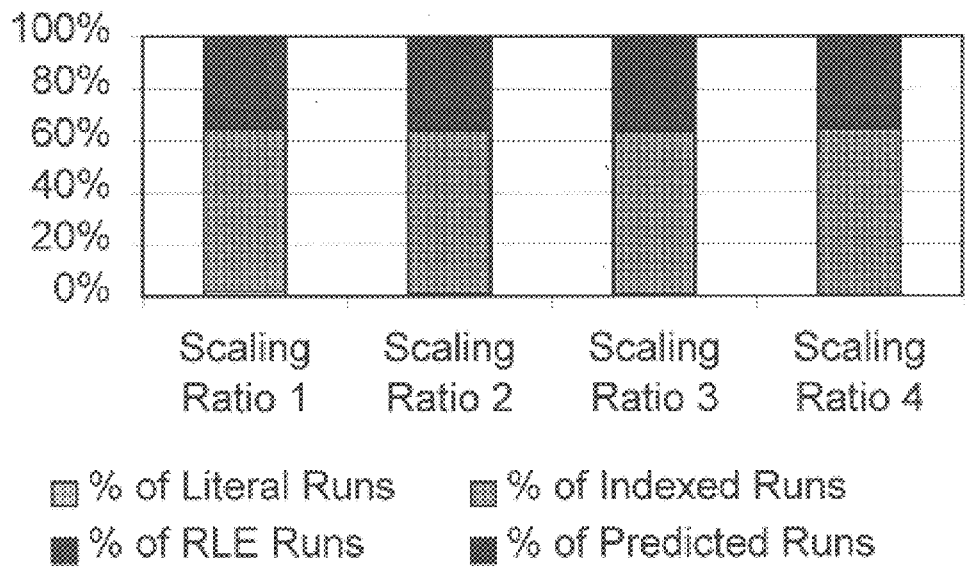
FIG. 24 shows the composition of compressed data file for the image of FIG. 11.
Figure 25:
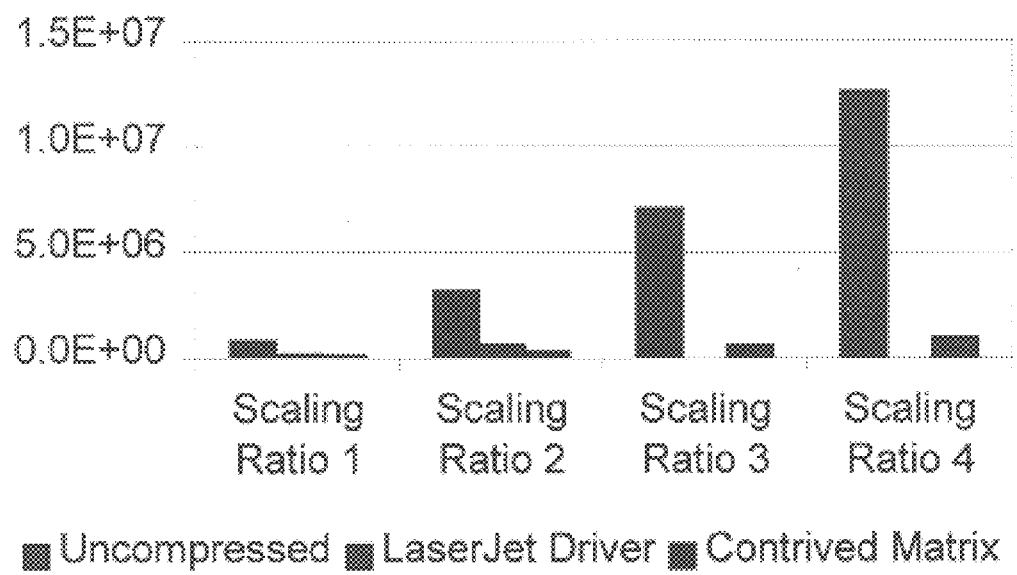
FIG. 25 shows a graph of the data sizes for the image of FIG. 11.
Figure 26:
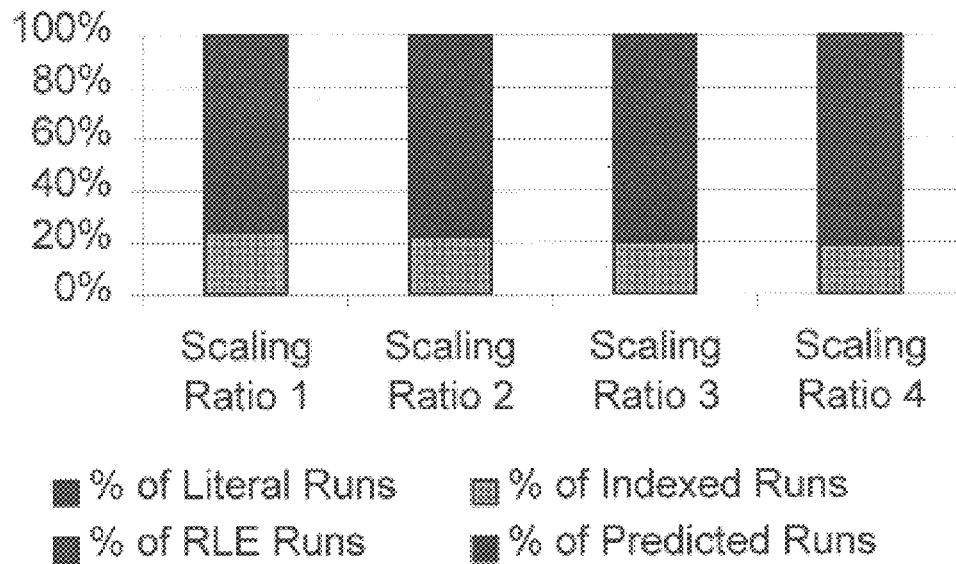
FIG. 26 shows the decomposition of the dithered image of FIG. 12.
Figure 27:
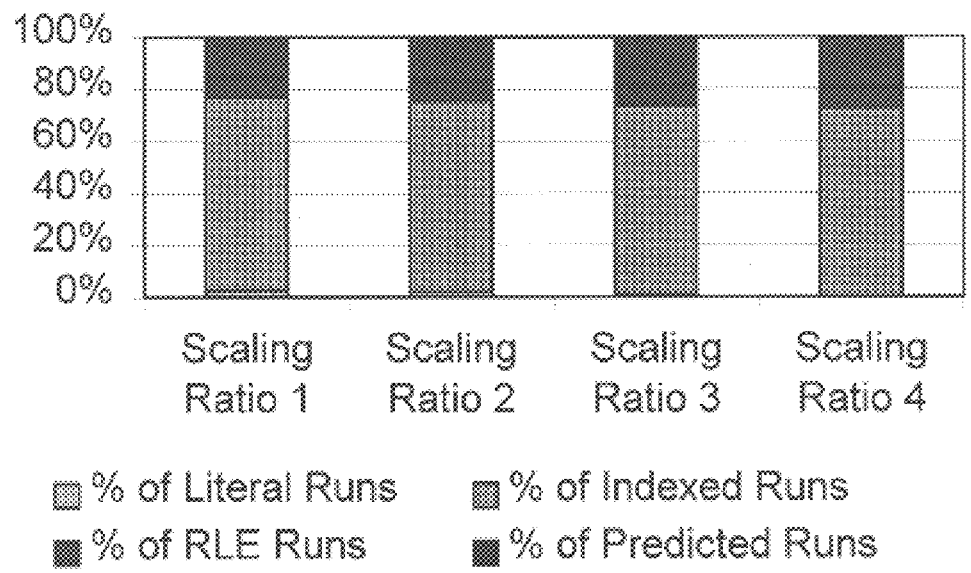
FIG. 27 shows the composition of compressed data file for the image of FIG. 12.
Figure 28:
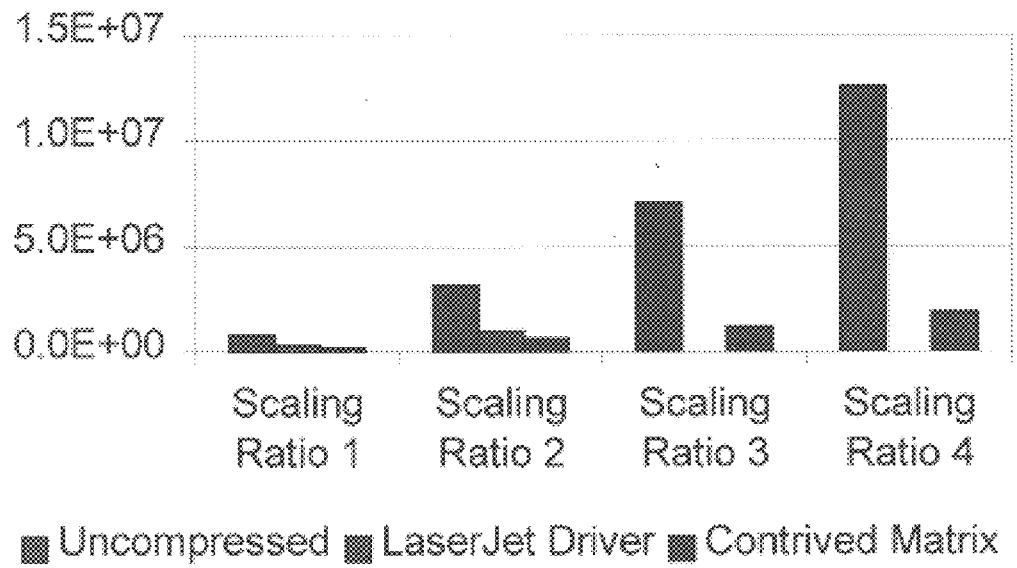
FIG. 28 shows a graph of the data sizes for the image of FIG. 12.
Figure 29:
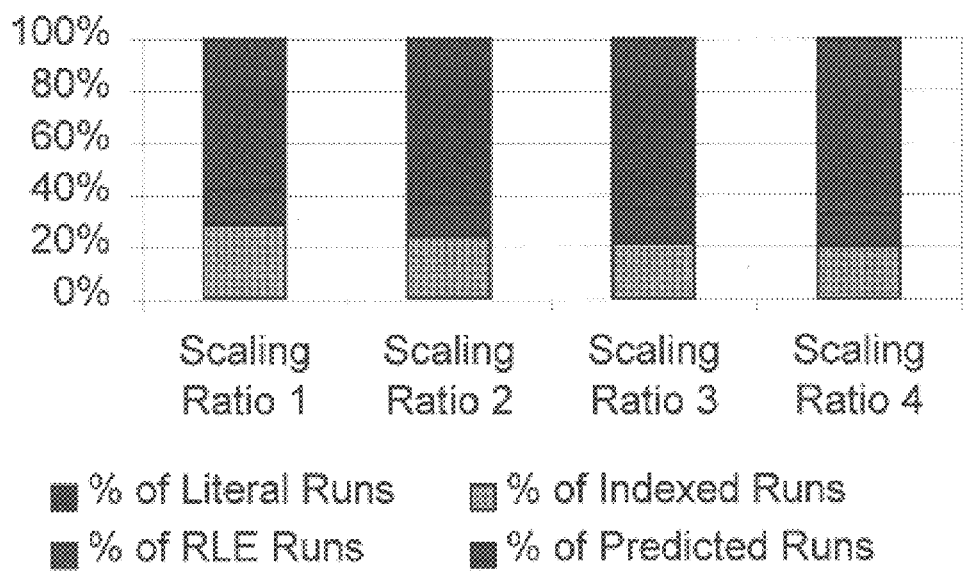
FIG. 29 shows the decomposition of the dithered image of FIG. 13.
Figure 30:
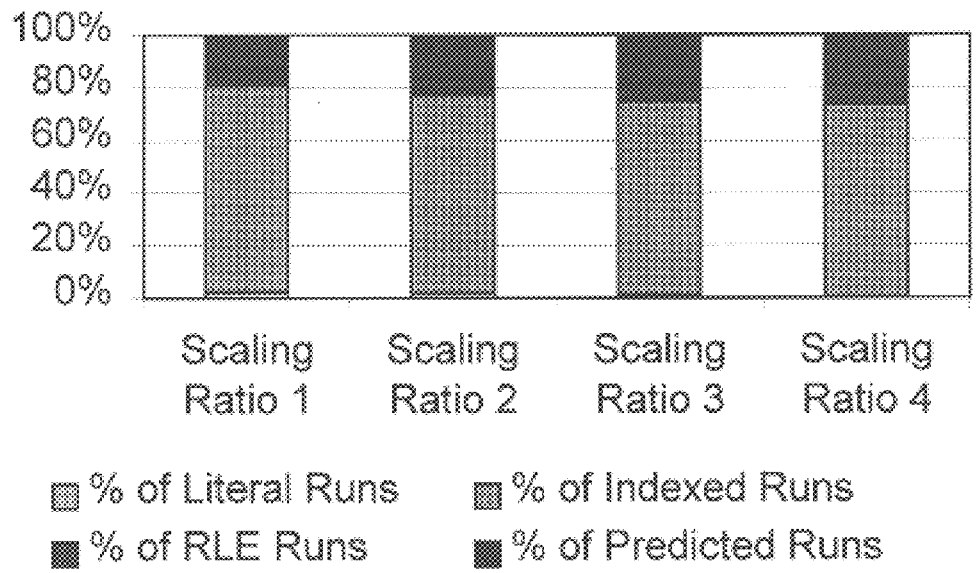
FIG. 30 shows the composition of compressed data file for the image of FIG. 13.
Figure 31:
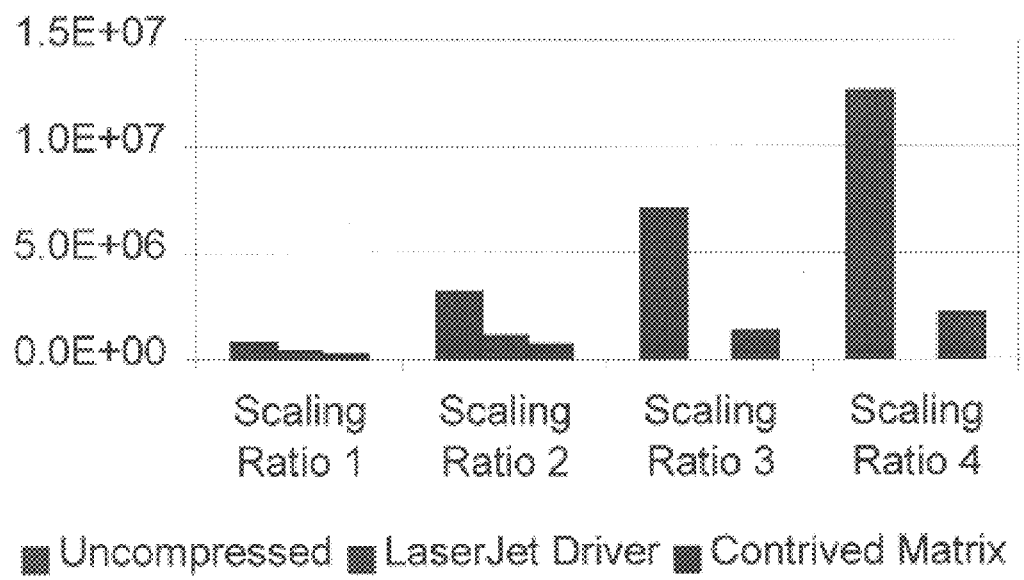
FIG. 31 shows a graph of the data sizes for the image of FIG. 13.

Grand Prismatic, as shown in FIG. 13 is the largest pool of hot water in Yellowstone National Park. This image has a lot of subtle soft shades from the rising steam, and some good high frequency areas.

FIG. 10 was selected for a detailed analysis of the compression due to the presence of high frequency image changes in the leaves and branches, making the image hard to compress. A scaling factor of 3:1 was used to create a lot of gray level changes within the 4×4 quadrants. Four source pixels will create twelve destination pixels and each of the lines within a quadrant will possibly derive the dither matrix pattern from two levels of gray. This will tend to increase the occurrence of literal runs because the resulting four bit pattern comes from two adjacent source pixels which may have different gray levels. The four bit pattern that is a candidate for a dither table entry may not find a match because the dot pattern is formed from the dither matrix entries from two different gray levels. If the pattern does not match a dither table entry, then a literal nibble will be created.

The image of fall trees was compressed using only indexed runs and literal runs. There are 49,774 literal runs of length 1, and 1,531 literal runs of length 2 for a total number of 51,305 literal runs representing 52,836 nibbles of image data. There were no literal runs of length greater than 2. The entire image is 56,623,104 pixels, or 14,155,776 nibbles. Only 0.4% of the dithered and scaled image could not match an entry in the dither table and created a literal nibble. Each literal run of length 1 nibble was expanded into a full byte when it was placed in the compressed data, and each literal run of length two resulted in two full bytes of compressed data, so the amount of compressed data from the literal runs was 52,836 bytes. The remaining 99.6% of image data, or 14,102,940 nibbles, were converted to dither table index values. There were 257,611 indexed runs (indexed command bytes plus indexed carry bytes), so the compressed index data was made of 257,611 overhead bytes and 3,548,563 indexed data bytes. This indexed data was compressed into 3,806,174 bytes of data for a compression ratio of 1.8:1. This data was combined with 6,206 bytes of DIB overhead bytes (header information, color table, and alignment bytes) to create a compressed DIB of 3,865,216 bytes. The uncompressed DIB was 7,077,950 bytes, so the overall compression ratio is 1.83:1.

Restricting the compression algorithm to the use of literal and indexed runs provided an insight to the feasibility of this compression approach. Only 0.4% of the image data was literal nibbles and 99.6% of the image data were able to be represented by indices. The literal nibbles were expanded by a factor of two when placed into the compressed data stream, and the indexed nibbles were compressed by a factor of 1.8, so 1.3% of the compressed data was the result of literal nibbles, and 98.6% of the compressed data was the result of indexed nibbles.

The next test was to take the same image and compress it with literal and indexed runs enabled as before. The same 1:3 scaling ratio was used. The compressed data was examined again looking for RLE (run length encoded) index candidates. This time each of the compression strings S1 through S4 were examined and occurrences of indices that contained eight or more consecutive identical values were deleted from the compressed data and replaced with an RLE indexed run.

An index is two bits, so four indices consume one byte. An RLE index run only consumes one byte, but it is not an even trade to convert four indices to an RLE indexed run. The indexed run consists of a command byte and up to sixty-four data bytes. A run of indexed data that is a candidate for conversion to RLE compressed data can occur anywhere within the indexed run. If the candidate indices occur in the middle of the indexed run, then the indexed run will be split into three runs. The first of the three runs would be an index run that has the indices that occurred before the RLE candidate indices. The second run would consist of the new RLE run. The third would be a new indexed run that consists of all the indices that followed the RLE run. Each of these runs has a command byte, so there were two command bytes created in this example. Restricting RLE indexed runs to a minimum of eight indexes will insure that the conversion of indexed data to RLE indexed data does not expand the amount of compressed data in any case.

It was expected that the number of literal nibbles would not change since the image was the same. As before, 52,536 nibbles of image data accounted for 52,536 bytes of compressed data. There were 338,292 RLE indexed runs created, accounting for 9,625,532 nibbles of image data. Each RLE indexed run is one byte, so the compression ratio for the RLE indexed runs was 14.2:1. RLE indexed runs accounted for 18.4% of the compressed data, or 338,292 bytes. 67.9% of the image was able to be represented by RLE indexed runs, 0.3% by literal runs, so 31.6% of the image was represented by indexed runs that were not eligible to be converted to RLE indexed runs. That 31.6% of image data accounted for 78.6% of the compressed data because the compression ratio for indexed runs dropped to 1.5:1. It was expected that the compression ratio for indexed runs would diminish because the indexed runs were fragmented by extracting RLE indexed runs, and the overhead of the command bytes would have a greater effect.

The same image was compressed with literal, indexed, RLE indexed, and predicted runs enabled. The program performed the compression as before, then each compressed line was examined again to identify candidates for predicted runs. A predicted runs indicates that a line contains data that exactly matches the data in the same X position in a line that occurred eight lines earlier, so the compressor need only create a command byte that tells the decompressor to extract data from the base line. A count that specifies the number of nibbles to be copied is contained within the command byte. Any type of run can be replaced, in part or in whole, by a predicted run. Some of the existing runs were entirely consumed by predicted runs when the compressed data was reprocessed, and some existing runs were fragmented when a predicted run started or terminated in the middle of an existing run.

Some of the literal runs were consumed by predicted row runs. The number of single nibble literal runs was reduced to 42,045 and there were 1,509 two nibble literal runs, for a total of 45,063 literal nibbles which is 0.3% of the image. The number of indexed runs was reduced to 236,726, representing 4,157,554 nibbles, or 28.0% of the image. The number of RLE indexed runs was reduced to 80,889, representing 1,441,646 nibbles, or 9.7% of the image. There were 168,038 predicted runs representing 9,196,929 nibbles, or 61.9% of the image. It is interesting to note that the majority of predicted runs came from data that were also candidates for RLE indexed runs. Intuitively, this makes sense because the dot activity in the cluster dot dither matrix is fairly localized for similar levels of gray, and both RLE indexed runs and predicted runs take advantage of that property.

This approach resulted in 0.3% of the image becoming represent by literal runs that had 1:2 data expansion and produced 2.7% of the compressed data. RLE indexed runs represented 9.7% of the image data, were compressed with a ratio of 8.9:1 and represented 4.8% of the compressed data. Indexed runs represented 28.0% of the image, compressed with a ratio of 1.6:1, and accounted for 77.7% of the compressed data. Predicted row runs represented 61.9% of the image data, were compressed with a ratio of 18.8:1, and produced 14.6% of the compressed data. The compressed DIB was 1,627,993 bytes for an overall compression ratio of 4.35:1.

The same image was also compressed at a scaling ratio of four to one. At this ratio, each source pixel will be expanded to four lines of four pixels each, and the destination image size is 12,582,974 bytes. Since each source pixel creates a four pixel wide segment in each line, there is a direct alignment between source pixels and destination nibbles, so there should not be any literal runs. The overall compression ratio should also improve due to the larger scaling factor because more destination pixels are created from a source pixel resulting in slightly more homogenous image.

As expected, there were no literal runs created. There were 381,374 indexed runs representing 6,620,240 image nibbles, or 26.2% of the image. There were 141,221 RLE indexed runs created, representing 2,531,208 image nibbles, or 10.0% of the image. There were 275,504 predicted runs, representing 16,037,536 nibbles, or 63.6% of the image. Compressed data was 0.0% literal runs, 78.6% indexed runs for a compression ratio of 1.6:1, 5.4% RLE indexed runs for a compression ratio of 8.9:1, and 15.9% predicted row runs for a compression ratio of 19.4:1. The compressed DIB contained 2,529,519 bytes and the uncompressed DIB contained 12,582,974 bytes, so the overall compression ratio was 4.97:1.

FIG. 8 to 13 are print samples created using the contrived dither matrix and the same images using a standard driver for HP LaserJet® printers. FIGS. 14 to 31 show compression summaries and scaling ratios for the same test images. The print file size using the HP LaserJet® printer driver is only included for scaling ratios 1 and 2 because the resultant image was too large to fit on a page using a 600 DPI driver.

In summary, using a contrived dither matrix and compression technique yielded slightly degraded image quality and good compression ratios. Image quality is difficult to quantify, but there is a detectable degradation of image quality when compared to the same images printed using the Hewlett-Packard LaserJet® printer driver. The contrived dither matrix images are not as sharp and have a slightly muddled look. It is thought that the degradation is caused by the fact that the light shades of gray of the contrived dither matrix are not subsets of the darker shades. Some dots that are used in light shades are not used in darker shades, and this causes the dot collection to wander a bit within the 4×4 quadrants. This wandering probably reduces the crispness of the image. It also causes a second problem. When two shades of gray are adjacent to each other, there will be some circumstances when too many dots are turned on. This effect makes the contrived dither matrix images appear as if they are lightly sprinkled with pepper. The pepper effect can be observed in the steam rising from the image of Grand Prismatic pool (FIG. 13), and in the sky of the picture of the plane taking off (FIG. 12). Image degradation is not very severe, and the compression benefits may make this a viable choice for selecting fast printing at the expense of image quality.

One could keep the current compression algorithm and use the real dither matrix and not the contrived dither matrix. This would result in a higher percent of the image being compressed by literal runs. Using the contrived dither method results in about 0.5% of the image to need literal runs, or about 3% of the compressed data, so the technique can afford to significantly increase the amount of literal runs and still produce good overall compression ratios.

Yet other approach would to change the index to the dither table to be one bit rather than two. This would only allow for two entries for each quadrant line rather than four. The patterns with all dots on and all dots off occur quite frequently, and at first glance it seems that they should be the ones retained, not the ones that should be dropped. The key is that when those patterns occur, they usually occur with large repetition. If there is no index for either all dots on or all dots off, then those nibbles will be made into literal runs. The resulting literal runs would have data bytes that all look the same and the line of compressed data could be compressed a second time using a simple run length encoding technique, and the literal runs would be quite compressible.

An alternative embodiment is to combination of the ideas presented above. Implement the typical dither matrix that is illustrated in FIG. 3 and FIG. 5. Remove the pattern of all dots on from the dither tables, and replace the pattern with a new pattern so that the typical dither matrix is completely described except for the all dots on. Whenever the dithered image produces a nibble of all dots on, that pattern would become a literal run. Modify the control bytes so that format 3 (binary 11) is used for literal runs. Whenever the compressor encounters quadrants with all dots on, it is very likely that it will be a long run. The control byte for a literal run with all bytes on would be 0xFF, the data bytes for a repeating literal run with all dots on would be 0xFF, and the carry byte for a literal run with all dots on would be 0xFF. Make a second pass of the compressed data with a run length encoded compressor.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for converting a multi-bit per pixel image into a single bit per pixel image, said method comprising the steps of:

first defining a contrived dither matrix;

second defining a plurality of indexes into the contrived dither matrix where each index defines a unique pattern;

tiling the contrived dither matrix over the multi-bit per pixel image;

dividing the tiled contrived dither matrix into a plurality of sub dither matrixes;

comparing a subportion of the multi-bit per pixel image with a corresponding sub dither matrix to create a subportion of the single bit per pixel image;

adding a sync byte; and first encoding a control byte to indicate a compression technique used, second encoding a predicted row run when there is a match between present data in the single bit per pixel image and a previous row of the single bit per pixel image;

third encoding a literal run when the subportion in the single bit per pixel image fails to match any index pattern;

fourth encoding an indexed run when a plurality of indexes are present; and fifth encoding an RLE run when a string of a single index is present.

2. The method of claim 1 wherein said step of adding further comprising the steps of:

second encoding in the sync byte a dither displacement value;

third encoding which sub dither matrix is compressed; and fourth encoding which line in the sub dither matrix subsequent information first relates to.

3. A method for converting a multi-bit per pixel image into a single bit per pixel image, said method comprising the steps of:

first defining a contrived dither matrix wherein each row has a reduced set of patterns;

second defining a plurality of indexes into the contrived dither matrix where each index defines one of the reduced set of patterns;

dividing the contrived dither matrix into a plurality of sub dither matrixes;

tiling the contrived dither matrix over the multi-bit per pixel image;

comparing a subportion of the multi-bit per pixel image with a corresponding sub dither matrix to create a subportion of the single bit per pixel image; and compressing the single bit per pixel image using the index where the one of the reduced patterns matches a pattern in the single bit per pixel image, compressing all subportions of the single bit per pixel image created by a first sub dither matrix followed by compressing all subportions of the single bit per image created by a second sub dither matrix and continuing until all subportions of the single bit per pixel image are compressed.

4. The method of claim 3 wherein said step of compressing further comprising the steps of:

adding a sync byte; and first encoding a control byte to indicate a compression technique used.

5. The method of claim 4 wherein said step of first encoding further comprising the steps of:

second encoding a predicted row run when there is a match between present data in the single bit per pixel image and a previous row of the single bit per image;

third encoding a literal run when the subportion in the single bit per pixel image fails to match an index pattern;

fourth encoding an indexed run when a plurality of indexes are present; and fifth encoding an RLE run when a string of a single index is present.

6. A method for converting a multi-bit per pixel image into a single bit per pixel image, said method comprising the steps of:

first defining a contrived dither matrix having four quadrants, each row in each quadrant having a reduced set of patterns;

second defining a plurality of indexes where each index defines one of the reduced set of patterns;

defining a super dither matrix to have four quadrants, each of the four quadrants of the super matrix described by the contrived dither matrix;

tiling the super matrix over the multi-bit per pixel image;

comparing a portion of the multi-bit per pixel image with a corresponding contrived dither matrix to create a portion of the single bit per pixel image; and compressing the single bit per pixel image using one of the pluralities of indexes where the one of the reduced patterns matches a pattern in the single bit per pixel image, compressing all portions of the single bit per pixel image created by a first quadrant of the contrived dither matrix followed by compressing all portions of the single bit per pixel image created by a second quadrant of the contrived dither matrix and continuing until all portions of the single bit per pixel image are compressed.

7. The method of claim 6 wherein said step of compressing further comprising the steps of:

adding a sync byte; and first encoding a control byte to indicate a compression technique used.

8. The method of claim 7 wherein said step of first encoding further comprising the steps of:

second encoding a predicted row run when there is a match between present data in the single bit per pixel image and a previous row of the single bit per pixel image;

third encoding a literal run when the pattern in the single bit per pixel image fails to match any index pattern;

fourth encoding an indexed run when a plurality of indexes are present; and fifth encoding an RLE run when a string of a single index is present.

9. The method of claim 7 wherein said step of adding further comprising the steps of:

second encoding in the sync byte a dither displacement value;

third encoding which of one four quadrants of the contrived dither matrix is compressed; and fourth encoding which row in the one four quadrants of the contrived subsequent information first relates to.

* * * * *